US007046862B2

(12) United States Patent
Ishizaka et al.

(10) Patent No.: US 7,046,862 B2
(45) Date of Patent: May 16, 2006

(54) IMAGE PROCESSING APPARATUS AND PROGRAM

(75) Inventors: Kanya Ishizaka, Kanagawa (JP);
Takashi Nagao, Kanagawa (JP)

(73) Assignee: Fuji Xerox Co., Ltd., Tokyo (JP)

(\*) Notice: Subject to any disclaimer, the term of this patent is extended or adjusted under 35 U.S.C. 154(b) by 738 days.

(21) Appl. No.: 10/288,427

(22) Filed: Nov. 6, 2002

(65) Prior Publication Data

US 2003/0095723 A1    May 22, 2003

(30) Foreign Application Priority Data

Nov. 7, 2001    (JP) .......................... P2001-341432

(51) Int. Cl.
*G06K 9/32*    (2006.01)

(52) U.S. Cl. ...................... 382/298; 382/300; 345/582

(58) Field of Classification Search ................ 382/298, 382/299, 300, 237, 250, 249, 264, 235, 248; 345/582, 660, 671, 502, 670; 348/561, 581, 348/699; 358/451, 445, 3.07, 525, 450; 375/240.16
See application file for complete search history.

(56) References Cited

U.S. PATENT DOCUMENTS 4,941,193 A    7/1990    Barnsley et al. ............ 382/249
5,065,447 A    11/1991    Barnsley et al. ............ 382/249
5,347,600 A    9/1994    Barnsley et al. ............ 382/249
5,453,788 A *    9/1995    Matsushima et al. ..... 348/395.1
6,141,017 A *    10/2000    Cubillo et al. .............. 345/660
6,928,397 B1 *    8/2005    Matsushiro .................... 703/2

FOREIGN PATENT DOCUMENTS

JP    11-8758    1/1999
JP    11-331595    11/1999

\* cited by examiner

*Primary Examiner*—Sheela Chawan
(74) *Attorney, Agent, or Firm*—Morgan, Lewis & Bockius LLP

(57) ABSTRACT

A domain block extracting unit extracts a domain block image from an original image. A range block extracting unit extracts a range block image from an area in the vicinity of the domain block image. The range block image has size being larger than a domain size and being smaller than an enlarged size. A reduced range block forming unit reduces the range block image to the domain size to produce a reduced range block image. A similarity judging unit compares each of the reduced range block images with the domain block image to select the highest similarity range block image. An enlarged range block forming unit forms an enlarged range block image by enlarging the size of the highest similarity range block image to an enlarged size thereof. An enlarged image acquiring unit produces an enlarged image of an original image by employing the respective enlarged range block images.

26 Claims, 20 Drawing Sheets

WEIGHTING PROCESS OF EACH PIXEL WHEN 2×2-BLOCK REGION IS OVERLAPPED

2×2-BLOCK REGION

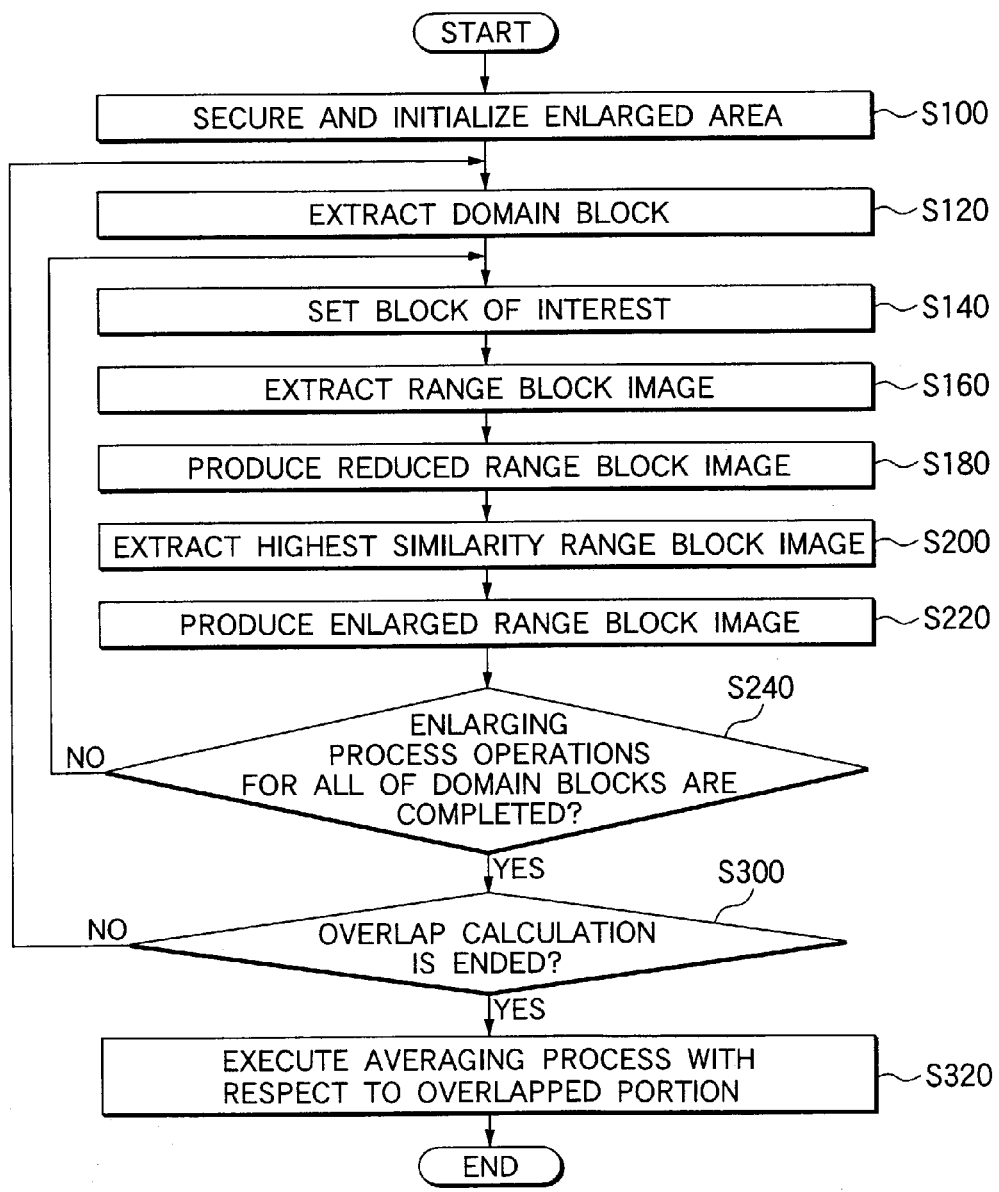

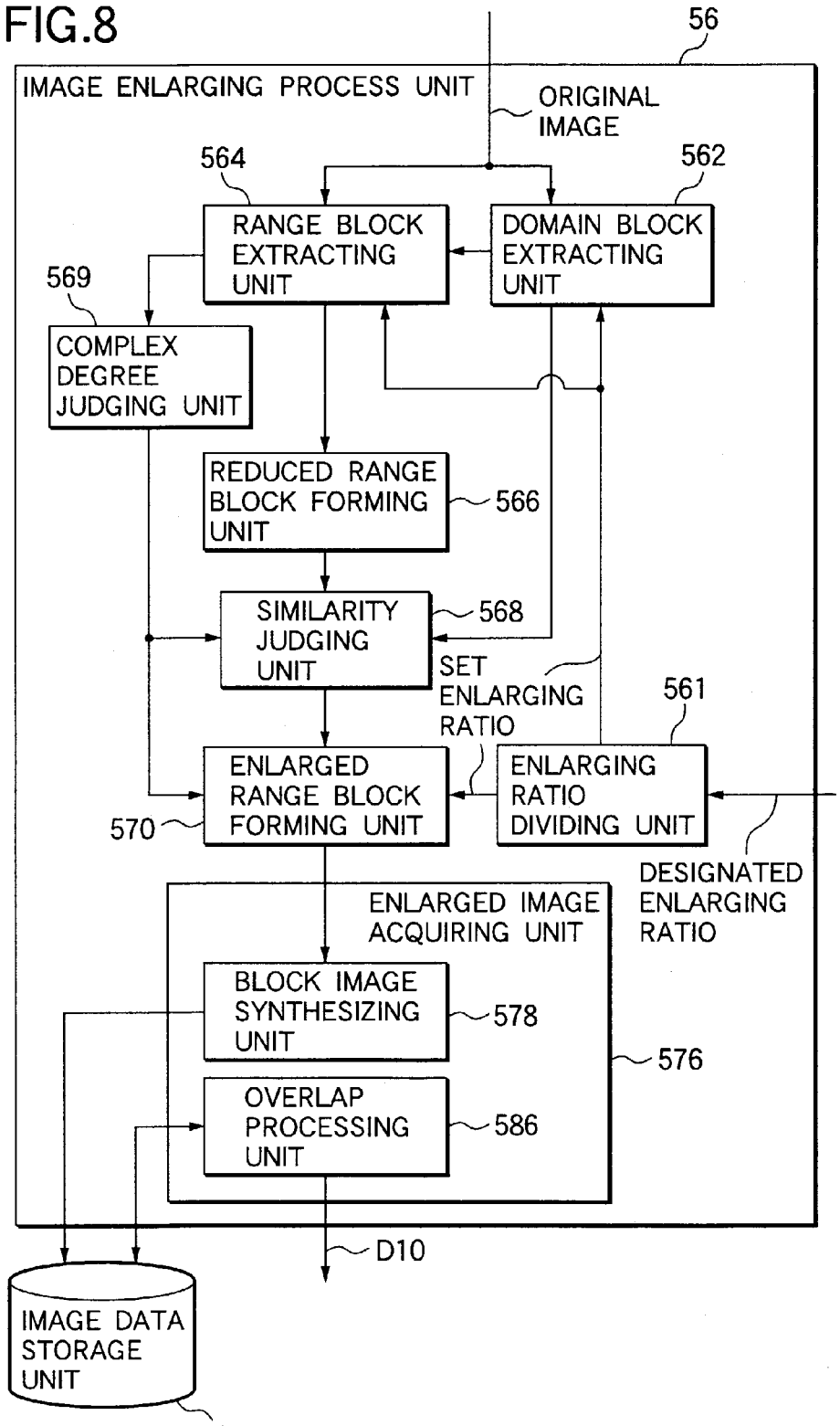

FIG.9

| DESIGNATED ENLARGING RATIO | COMBINATION OF ENLARGING RATIOS IN SECOND EMBODIMENT | COMBINATION OF MAGNIFICATIONS UNDER BEST IMAGE QUALITY |
|---|---|---|
| 2 | 2 | (2) |
| 3 | 3 | 2, 2→3/4 |
| 4 | 2, 2 | (2, 2) |
| 5 | 5 | 2, 2, 2→5/8 |
| 6 | 2, 3 | 2, 2, 2→6/8 |
| 7 | 7 | 2, 2, 2→7/8 |
| 8 | 2, 4 | 2, 2, 2 |
| 9 | 3, 3 | 2, 2, 2, 2→9/16 |
| 10 | 2, 5 | 2, 2, 2, 2→10/16 |
| 11 | 11 | 2, 2, 2, 2→11/16 |
| 12 | 3, 4 | 2, 2, 2, 2→12/16 |
| 13 | 13 | 2, 2, 2, 2→13/16 |
| 14 | 2, 7 | 2, 2, 2, 2→14/16 |
| 15 | 3, 5 | 2, 2, 2, 2→15/16 |
| 16 | 4, 4 | 2, 2, 2, 2 |

COMBINATION UNDER BEST IMAGE QUALITY=ENLARGING RATIO OF $2^n$ OR COMBINATION OF ENLARGEMENT THEREOF AND REDUCTION

PARENTHES DENOTE THE SAME COMBINATION AS IN THE LEFT COLUMN

COMBINATION OF ENLARGEMENT AND REDUCTION= COMBINATION OF SECOND AND FIFTH EMBODIMENTS

DESIGNATED MAGNITUDE=K→OBTAIN "n" SATISFYING K≦$2^n$, REPEAT TWO-TIMES ENLARGEMENT n TIMES, AND REDUCE BY K/$2^n$ WHEN K<$2^n$

IMAGE PROCESSING APPARATUS AND PROGRAM

The present disclosure relates to the subject matter contained in Japanese Patent Application No.2001-341432 filed on Nov. 7, 2001, which is incorporated herein by reference in its entirety.

BACKGROUND OF THE INVENTION

1. Field of the Invention

The present invention is related to an image processing apparatus for enlarge-processing an image represented in a multi-gradation manner, and also is related to a program for executing the image enlarge-processing operation by utilizing a computer.

2. Description of the Related Art

As one of signal processing operations with respect to digital images, there are enlarging process operations. For instance, various sorts of image processing functions having high image qualities have been required in database fields and high-precision color printing field. As one of these image processing functions, image enlarging functions are required. This image enlarging process operation may constitute one of basic processing operations with respect to systems capable of editing, filing, displaying, and printing images. For instance, in such a case that digital images entered from external sources are printed out by printers having different resolution, or are displayed on display units in an enlarging manner, enlarging process operations of these digital images are required. For example, such an image enlarging operation is required in the case that image data standardized by 720 (horizontal direction)×480 (vertical direction) pixels is displayed on such a display unit having 800×600 pixels in a full screen mode. Also, this enlarging process operation may constitute a very important function which may also be used as a resolution converting method required so as to couple media having different resolution with each other, while the media are known as, for instance, the HDTV (High Definition Television) system, NTSC type television, electronic still cameras, medical imaging systems, and printing image systems. Furthermore, very recently, needs for enlarging process operations having high image qualities are positively made in such a case that since image data having relatively low resolution (display resolution) of approximately 75 [dpi] are mainly displayed are popularized, these low resolution image data (e.g., images of home pages on the Internet and digital video) are printed out by high-resolution printers, so as to obtain print-out results having high image qualities.

As methods for enlarge-processing multi-value images represented in a multi-gradation mode, namely methods for acquiring values of respective pixel positions after being enlarged, conventionally, a large number of methods have been proposed, for instance, such enlarging systems for basically employing interpolations (will also be referred to as "interpolation enlarging systems" hereinafter) have been well known, e.g., the nearest neighbor method, the bilinear method, and the cubic convolution method.

The nearest neighbor method corresponds to such a method that when pixels are inverse-mapped onto an original image, a pixel value of such a pixel located at the nearest distance thereof is used as each of pixel values after being enlarged. For example, assuming now that an enlarging ratio along an x direction is 'a', and an enlarging ratio along a y direction is "b", a calculation is made of inverse-mapping points on the original image, where the respective coordinate points (X, Y) after being enlarged are enlarged by 1/a and 1/b, respectively, and then, such a pixel value on the original image, which are located at the nearest distance, are set as the pixel values (X, Y).

The bilinear method corresponds to the following method. That is, assuming now that pixel values among pixels are changed in a linear manner, a region surrounded by pixel points (4 points in four neighbor pixels) along the x direction and the y direction is linear-approximated (linear-interpolated) with reference to pixels (e.g., 4 neighbor pixels) located in the vicinity of a point where a pixel after being enlarged is inverse-mapped so as to acquire a pixel value at the inverse-mapped point. In this bilinear method, although the processing load thereof becomes larger than that of the nearest neighbor method, the calculation amount thereof is relatively smaller than that of this nearest neighbor method. Also, since the linear interpolation itself owns the smoothing effect, jaggy can hardly appear, as compared with the nearest neighbor method.

The cubic convolution method corresponds to such a method. That is, while an interpolation function for approximating a sinc function $\{\text{sinc}(x)=\sin(x)/x\}$ is defined based upon the sampling theory, neighbor pixels as to a point where pixels after being enlarged are inverse-mapped are convoluted with the above-described approximate interpolation function so as to acquire pixel values after being enlarged. These neighbor pixels are, for instance, 16 pixels constructed of 4 pixels along x direction and Y direction.

This cubic convolution method is established based upon the following idea. That is, while utilizing such an ideal characteristic that the frequency characteristic of the sinc function is equal to "1" within the Nyquist frequency and is equal to "0" outside this Nyqust frequency, folding distortions caused by resembling operation are suppressed. Since this cubic convolution method can produce a sharp image, the resultant image quality thereof becomes relatively better than that of the above-described two other methods.

However, these interpolating/enlarging methods own such a trend that a blurring phenomenon essentially occurs. Although the nearest neighbor method can execute the high-speed processing operation due to the simple processing operation and the small calculation amount, since one pixel of an original image is directly enlarged in a rectangular shape, there are large degrees of visible image quality deteriorations. For instance, in the case that either an inclined line or a boundary line is present in an original image, a zig-zag-shaped deterioration called as "jaggy" may be produced in an edge portion and an inclined line portion contained in an enlarged image, and/or when magnification is large, and enlarged image becomes a mosaic-shape (block-image-shaped). In the bilinear method, since the smoothing (low-pass filtering) effect is emphasized, an entire image may become blurred. That is, edge portions are mainly smoothed by the low-pass filtering effect, while such an assumption that an image is changed in a linear manner cannot be applied to the edge portions. Since the calculation amount of the cubic convolution method becomes larger than the calculation amounts of other two methods and the reference range thereof become larger, this cubic convolution method is not suitable when high-speed processing operation is required. Also, since the sinc function corresponds to an infinitely continued function, this cubic convolution method owns a high-frequency-range-emphasized characteristic which is caused by that this infinitely continued function is cut within a predetermined range (namely, −2 to +2 in an example of 16 pixels). As a result, a small amount of so-called "jaggy" may be produced in an edge portion, and a noise component may be emphasized, which are not so stronger than those of the nearest neighbor method.

To the contrary, very recently, as such an approach which is completely different from the above-described interpolating/enlarging methods, an enlarging method capable of preventing occurrences of blurring phenomenon, jaggy, and block distortions has been proposed by utilizing iterated conversion coding operations. For instance, there are certain enlarging methods using the fractal conceptional idea among these iterated conversion coding operations (for instance, U.S. Pat. No. 5,065,447 etc.). Also, the normal IFS (Iterated Function System) is employed so as to utilize the fractal conceptional idea. An enlarging system established based upon the iterated conversion coding operation by using the fractal conceptional idea will now be referred to as a "fractal enlarging manner."

The fractal conceptional idea implies that a self-similar characteristic of an image under such an initial condition that when a portion of an image is derived from an entire image, another image which is better resembled to this derived image is present within this image, while having a different size. Then, the fractal enlarging method owns such a merit that since a block image distortion does not appear and furthermore self-similar characteristic established between block images having different sizes is utilized within an image, the fractal enlarged image does not depend upon resolution during decoding operation. Also, this fractal enlarging method can obtain an enlarged image having a high image quality even in a relatively large enlarging ratio. For example, the above-described U.S. Pat. No. 5,065,447 has proposed the method for acquiring the enlarged image as follows. That is, as to an initial image having an enlarged size, such a range block image which has been enlarged in the same enlarging ratio due to the enlarged initial image is coordinate-converted and pixel-value-converted. Also, such a process operation is repeated carried out for replacing the converted position of the range block image by the position of the domain block image enlarged in the same enlarging ratio. In this fractal enlarging method, while the feature of the fractal conceptional idea is utilized, the enlarged image having a less blurring component can be obtained by suppressing the occurrence of jaggy.

However, in the enlarging method using the iterated conversion coding operation, since the enlarged image is produced by iterating a predetermined process operation, the processing time thereof would become considerably longer than that of the interpolating/enlarging method. For instance, in the fractal enlarging method, the processing time is increased by seeking the range block images. Furthermore, the visibly-allowable enlarged image can be hardly produced by merely executing the substituting process operation into the domain block image only one time. As a result, since these process operations are iterated so as to acquire the enlarged image, the resultant processing time required for obtaining the visibly-allowable enlarged image would be prolonged. Also, this fractal enlarging method newly owns another image quality deterioration problem. That is, as to a document image and a stepped edge portion, block distortions may occur, noise-shaped trash (smear) may he produced, and oozing of splinter-shaped pixel values may occur. Also, the conventional fractal enlarging method has a problem such that reproducibility of a busy portion is deteriorated (namely, blurring phenomenon and noise).

As the trial methods capable of solving the problems related to the image qualities owned by the fractal enlarging method, for instance, some methods have been proposed in U.S. Pat. No. 6,141,017, Japanese Laid-open Patent Application No. HEI 11-331595, and Japanese Laid-open Patent Application No. HEI 11-8758.

The above-described U.S. Pat. No. 6,141,017 has proposed the method for suppressing the discontinuity characteristic occurred in the boundary between the block images in such a way that the domain block images are produced in the overlapping manner, and when the range block image is substituted, only the inside portion of the range block image is substituted for the inside portion corresponding to the domain block image. Also, this US patent has proposed the method for performing the enlarging process operation capable of reproducing the edge portion under better condition by way of the fractal enlarging method in such a manner that the block image is divided into the edge portion and the flat portion from dispersion of the pixel values contained in the block image which is required when the pixel value converting coefficient is calculated, while suppressing that the flat portion becomes the pictorial tone by employing another method with respect to the flat portion. However, this conventional method still cannot solve the deterioration problem such that the noise-shaped trash occurs at the stepped edge portion, and also, the splinter-shaped pixel value oozes.

Also, the above-explained Japanese Laid-open Patent Application No. HEI-11-331595 has proposed such a method capable of suppressing the discontinuity characteristic at the boundary between the block images in such a manner. That is, while both the fractal enlarging method and the bilinear enlarging method are applied to the image, when a difference thereof is small, the process result obtained by the fractal enlarging method is employed, whereas when a difference thereof is large, the result obtained by the bilinear method is employed. Alternatively, the results are blended to each other in response to the magnitude of the difference. However, this conventional method owns such a trend that the bilinear method is selected at the edge portion where the difference between the bilinear enlarging method and the fractal enlarging method. As a consequence, this conventional method owns such a drawback that the clear edge reproduction (namely, feature achieved by fractal enlarging method) cannot be realized, so that the resultant image becomes blurred.

Also, the above-described Japanese Laid-open Patent Application No. HEI-11-8758 has proposed such a method capable of performing a seeking operation in a high speed by that while the histogram means for storing the use frequency of the range block images is provided, such a range block image whose use frequency is low is not used in the seeking operation. However, since the restriction in the range block image seeking range based upon the use frequency has no reason in view of the image quality in this method, there is such a drawback that this restriction may cause the image quality to be deteriorated.

As previously explained, the conventional methods capable of improving the fractal enlarging method have separately proposed the improving ideas with respect to the image quality problems and the processing time problems. These image quality problems are known as the jaggy, the blurring phenomenon, and the block distortions, which may occur when the enlarged images are produced. However, these problems could not yet been solved in a comprehensive manner.

SUMMARY OF THE INVENTION

The present invention has been made to solve the above-described conventional problems, and therefore, has an object to provide both an image processing apparatus and a program, which are capable of enlarging an image, while a balance with respect to processing time is secured, and occurrences of image deteriorations such as a blurring phenomenon, jaggy, and a block distortion are prevented.

That is to say, an image processing apparatus, according to the present invention, is an image processing apparatus for enlarge-processing an original image represented by a large number of pixels so as to acquire an enlarged image, comprising a domain block extracting unit for dividing the original image in a first block unit so as to extract a plurality of domain block images from the original image; and a range block extracting unit for extracting a range block image in a second block unit from the original image, the second block unit being larger than the first block unit and also being smaller than an enlarged block unit which is obtained by enlarging the first block unit in a preset enlarging ratio. The image processing apparatus is further provided with an enlarged range block forming unit for forming an enlarged range block image in such a manner that the range block image extracted by the range block extracting unit is enlarged in the enlarged block unit, and each of pixel values of the image enlarged in the enlarged block unit is converted based upon a relationship between the domain block image and the range block image; and an enlarged image acquiring unit for acquiring an enlarged image in such a manner that while employing each of the enlarged range block images formed by the enlarged range block forming unit, the original image is enlarged in the preset enlarging ratio.

Also, the invention according to another aspect of the invention may define further advantageous concrete examples of the image processing apparatus according to the present invention. In addition, a program, according to the present invention, is suitable for realizing the image processing apparatus according to the present invention by employing a computer in a software manner. It should be understood that the program may be provided in a computer-readable storage medium by being stored thereinto. Alternatively, this program may be distributed via either a wired communication means or a wireless communication means.

[Operation]

In the image processing apparatus with employment of the above-described arrangement, the range block extracting unit extracts the range block image in the second block unit from the original image, and the second block unit is larger than the first block unit and also is smaller than the enlarged block unit which is obtained by enlarging the first block unit in the present enlarging ratio. In other words, the range block extracting unit sets such a range block having a proper size which is larger than the size of the domain block and also is smaller than a desirable enlarged size.

The enlarged range block forming unit forms the enlarged range block image in such a manner that the extracted range block image is enlarged in the enlarged block unit, and each of pixel values of the image enlarged in the enlarged block unit is converted based upon a relationship (for example, resemblant relationship) between the domain block image and the range block image. In other words, the enlarged range block forming unit enlarges the set range block to a desirable size (at this time, predetermined pixel value conversion is apparently required), and then acquires a new pixel value based upon a relationship between the domain block image (original image) and the range block image (namely, pixel value is again converted). It should be noted that as to such a technical point that both the domain block and the range block are set to obtain the enlarged image, such an enlarged image can be obtained by effectively using the feature of the conventional fractal conceptional idea.

BRIEF DESCRIPTION OF THE DRAWINGS

FIG. 8 is a block diagram for indicating an image enlarging process operation of a second embodiment.

FIG. 9 is a diagram for indicating an example of combinations of enlarging ratios used in subdivisions of enlarging ratio by an enlarging ratio dividing unit.

DETAILED DESCRIPTION OF THE PREFERRED EMBODIMENTS

Referring now to drawings, various embodiments of the present invention will be described in detail.

Figure 1:
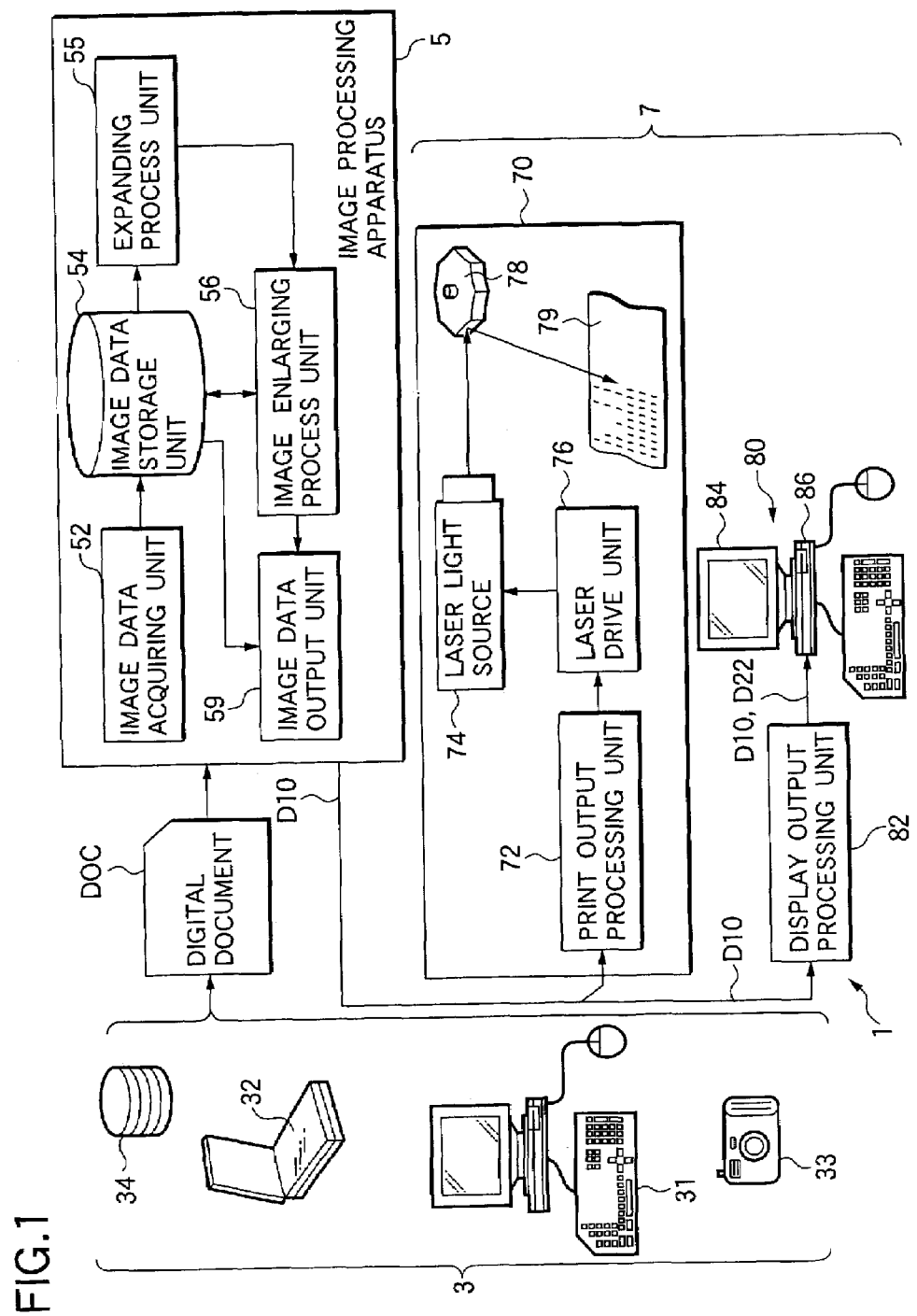
FIG. 1 is a block diagram for indicating an image processing system equipped with an image processing apparatus according to the present invention.

FIG. 1 is a block diagram for indicating an image processing system (will be simply referred to as a "system" hereinafter) 1 equipped with an image processing apparatus according to the present invention. The system 1 includes an image input terminal 3, an image processing apparatus 5, and an image output terminal 7.

The image input terminal 3 may involve an arbitrary number of image sources for executing such process operations to form a digital document (will be simply referred to as a "document" hereinafter) DOC and to edit the document DOC, such as a personal computer 31, a color scanner 32, a digital camera 33, and a storage medium such as a hard disk unit. For example, this image input terminal 3 may be a terminal apparatus equipped with a communication function capable of acquiring an image via a communication network (not shown). An application program for forming a document DOC is installed in each of these terminal apparatus. Image data indicative of documents DOCs have been described in such an image format (for example, JPEG, BMP, PNG and the like) which can be processed by the image processing apparatus 5. The image input terminal 3 inputs a document DOC into the image processing apparatus 5 which constitutes a portion of the system 1.

The image processing unit 5 includes an image data acquiring unit 52, an image data storing unit 54, an expanding process unit 55, an image enlarging process unit 56, and an image data output unit 59. The image data acquiring unit 52 acquires digital image data indicative of the document DOC. The image data storing unit 54 temporarily stores thereinto image data. When an image acquired by the image data acquiring unit 52 corresponds to a compressed image, the expanding process unit 55 expands this compressed image. The image enlarging process unit 56 enlarge-processes an image in arbitrarily set resolution. The image data output unit 59 inputs enlarged image data "D10" indicative of an image, which has been enlarge-processed, into the image output terminal 7.

The image data storage unit 54 stores thereinto input image data acquired by the image data acquiring unit 52, enlarged image data which has been enlarge-processed by the image enlarging process unit 56, or various sorts of calculation results obtained in halfway and processing parameters, which are employed in the enlarging process operation executed in the image enlarging process operation 56.

The image output terminal 7 includes a raster-output-scan (ROS)-based print engine 70, a display apparatus 80, and the like. This raster-output-scan-based print engine 70 is operable in combination with various sorts of functions of the image processing apparatus S, and is to cause the system 1 to be operated as a digital printing system. The display apparatus 80 is used to be operated as an image display system.

The print engine 70 contains a print-out processing unit 72, a laser light source 74, a laser driving unit 76, and a polygon mirror (rotary multi-plane mirror) 78. The print output processing unit 72 executes a predetermined process operation for print out purpose with respect to the enlarged image data D10 outputted from the image processing apparatus 5. The laser light source 74 emits a laser light beam. The laser driving unit 76 controls (namely, modulates) the laser light source 74 in correspondence with data outputted from the print-out processing unit 72. The polygon mirror 78 reflects the laser light beam emitted from the laser light source 74 toward a photosensitive member 79. The print-out processing unit 72 produces data indicative of a plurality (preferably, at least three) of separated colors in accordance with the well-known technique with respect to the enlarged image data D10 representative of an enlarged image, and then renders the produced data (namely, being expanded to raster data). For example, at least three (preferably four) sets of raster data are produced from a YCrCb color system which is indicated by the expanded-color-correction digital data D10. For instance, such raster data are produced which have been mapped to either a CMY color system or a CMYK color system, and then, have been color-separated for print out purpose. Also, while the print-out processing unit 72 executes such a raster data processing operation, this print-out processing unit 72 executes an under color removing (UCR) operation, or executes a gray component replacement (GCR). In this under color removing operation (UCR), a CMY color component of a color image is color-subtracted. In the gray component replacement (GCR), the color-subtracted CMY component is partially replaced with a K component. Furthermore, the print-out processing unit 72 may perform a linearization of color separation, or a similar process operation in order to adjust a toner image of an output image which is formed in response to output data (CMYK etc.)

With employment of this structure, the print engine 70 causes the laser light beam generated from the laser light source 74 to be reflected on a plurality of planes (surfaces) on the polygon mirror 78 so as to expose a photosensitive member 79, and forms a latent image on the photosensitive member 79 in a scanning manner. When the latent image is formed, the print engine 70 develops this latent image in accordance with an arbitrary developing method which is properly selected from a large number of developing methods known in this technical field, and then outputs a color image, which has been enlarge-processed by the image processing apparatus 5, as a visible image. Apparently, the print engine 70 may output such a color image, which has not been enlarge-processed, as a visible image. It should also be noted that when a color image is outputted as a visible image, data indicative of the color image contains at least three pieces (preferably four pieces) of color separation data (for instance, C, M, Y, K and so on), and these respective colors are separately processed as an image plane, or are processed in a luminance-chrominance format.

The display apparatus 80 includes a display output processing unit 82, and a display unit 84. The display output processing unit 82 executes a predetermined output process operation based upon the enlarged image data D10 outputted from the image processing apparatus 5. The display unit 84 is constructed of a CRT (cathode-ray tube), a liquid crystal display (LCD), or an organic EL (electro-luminescence), and displays a visible image based upon data outputted from the display output processing unit 82. This display output processing unit 82 may be preferably installed, for example, in a personal computer main body 86, which is used in combination with the display unit 84, in either a software manner or a hardware manner. The display output processing unit 82 produces data indicative of a plurality (preferably, at least three) pieces of separated colors in accordance with the well-known technique with respect to the enlarged image data D10 inputted from the image processing apparatus 5, and then renders the produced data (namely, being expanded to raster data). For example, raster data are produced from a YCrCb color system which is indicated by the enlarged color image data D10. That is, such raster data are produced which have been mapped to, for example, an RGB display color system, and then, have been color-separated for display purpose. Also, while the display output processing unit 82 executes such a raster data processing operation, this display output processing unit 82 may execute a color correction process operation in response to a desirable matter of an operator. With employment of this arrangement, the display apparatus 80 displays the color image which has been enlarge-processed by the image processing apparatus 5 as a visible image. Apparently, this display apparatus 80 may display such a color image which has not be enlarge-processed as a visible image.

It should be understood that for example, a personal computer (PC) and the like may be utilized as the print-out processing unit 72 and/ox the display output processing unit 82. Also, the display apparatus 80 may be commonly used with the personal computer provided on the side of the image input terminal 3.

Figure 2:
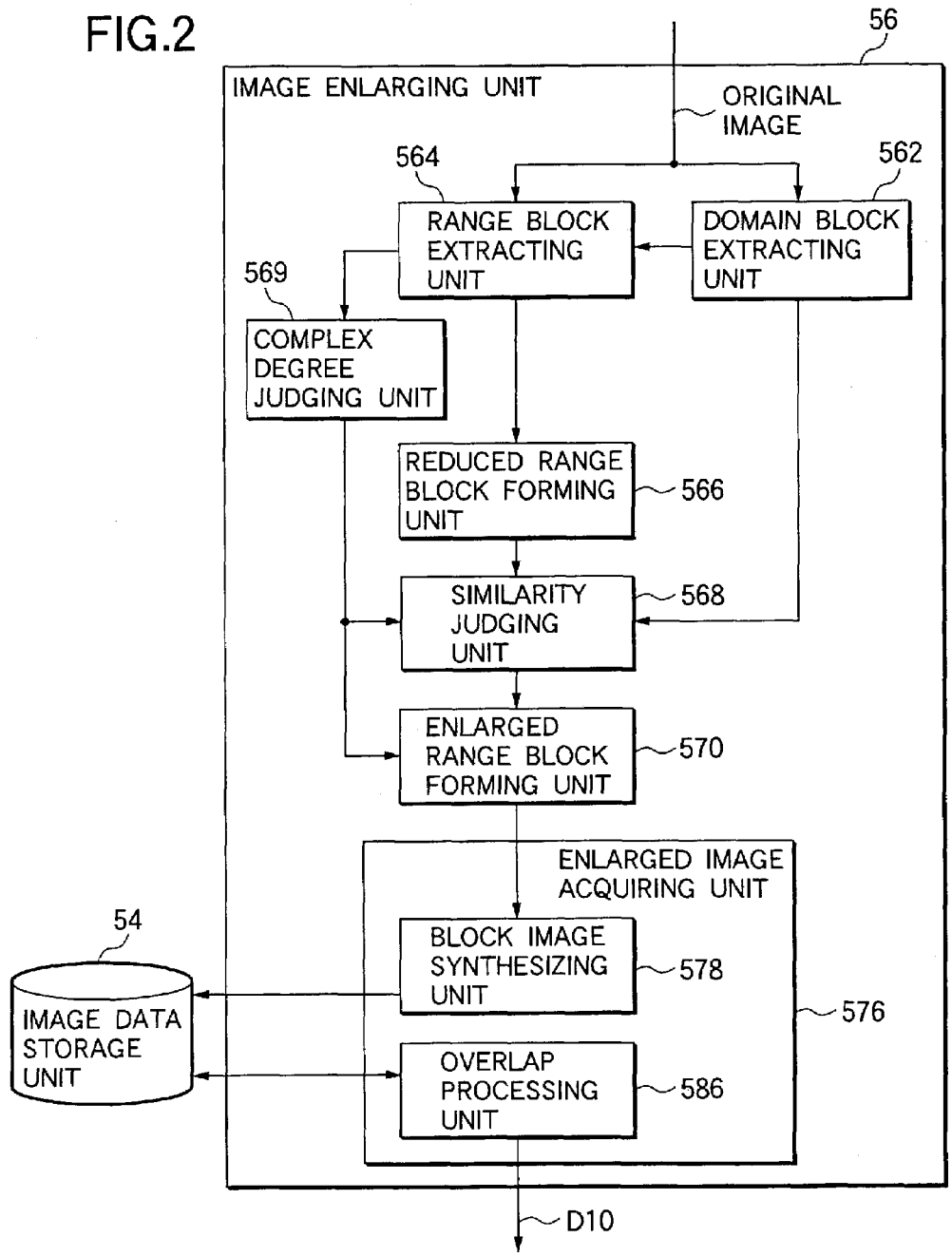
FIG. 2 is a block diagram for showing in detail an image enlarging process unit of a first embodiment employed in the image processing apparatus.

FIG. 2 is a block diagram for showing a detailed internal arrangement of the above-explained image enlarging process unit 56 of the image processing apparatus 5. The image enlarging process unit 56 includes a domain block extracting unit 562, a range block extracting unit 564, and a reduced range block forming unit 566. The main block extracting unit 562 extracts from an original image, a domain block image having a size "D" (main scanning direction×sub-scanning direction=MD×ND pixels; MD=ND is also available) corresponding to a first block unit. The range block extracting unit 564 extracts a plurality of range block images having a size "R" (main scanning direction×sub-scanning direction=MR×NR pixels; MR=NR is also available) corresponding to a second block unit. The reduced range block forming unit 566 reduces each of the plural range block images extracted by the range block extracting unit 564 in the same size as the above-described domain block image, so that a plurality of reduced range block images are produced. It is so assumed that the size "R" corresponding to the second block unit is larger than the size "D" corresponding to the first block unit, and further, is smaller than an enlarged block unit which is obtained by enlarging the size "D" (namely first block unit) in a preset enlarging ratio.

The image enlarging process unit 56 also includes a similarity judging unit 568, and an enlarged range block forming unit 570. The similarity judging unit 568 judges a similarity between each of the reduced range block images and the domain block image extracted by the domain block extracting unit 562 by employing a plurality of reduced range block images produced by the reduced range block forming unit 566. The enlarged range block forming unit 570 performs an enlarging process operation as to such a range block image which is judged by the similarity judging unit 568 in such a manner that this judged range block image owns a higher similarity (it implies "highest similarity" in this example) with respect to the domain block image among a plurality of range block images. Then, the enlarged range block forming unit 570 produces such an enlarged range block image having the same size as a size (size "r*D") of an enlarged domain block image whose enlarging ratio "r" is designated with respect to the domain block image. Also, the image enlarging process unit 56 includes an enlarged image acquiring unit 576. The enlarged image acquiring unit 576 acquires such an enlarged image by enlarging the original image at a preset enlarging ratio, while employing each of the enlarged range block images produced by the enlarged range block forming unit 570.

The image enlarging process unit 56 further includes a complex degree judging unit 569 for judging a complex degree of a range block image. The complex degree judging unit 569 judges as to whether or not a large number of peaks and valleys are contained in, for example, a range block image. In other words, this complex degree judging unit 569 judges as to whether or not the range block image contains a large amount of high frequency components. Alternatively, this complex degree judging unit 569 may have a similar function to that of a block image analyzing unit 563 (will be discussed later). The similarity judging unit 568 judges a similarity with reference to the complex degree of the range block image judged by the complex degree judging unit 569. Also, the enlarged range block forming unit 570 determines a pixel value of an enlarged range block image with reference to the complex degree of the range block image judged by the complex degree judging unit 569.

The enlarged image acquiring unit 576 includes a block image synthesizing unit 578, and an overlap processing unit 586. The block image synthesizing unit 578 acquires each of the enlarged range block images which have been enlarge-processed by the enlarged range block forming unit 570, and synthesizes these acquired enlarged range block images with each other, so as to produce an enlarged image which has been enlarged in a preset enlarging ratio with respect to the original image. The overlap processing unit 586 acquires pixel values of such pixels of an overlap portion (superimposed portion) which has been overlap-processed in connection with an overlap process operation based upon the pixel values of the respective pixels of this overlap portion. The block image synthesizing unit 578 produces an enlarged image by storing, for example, each of the acquired enlarged range blocks into a predetermined area of the image data storing unit 54. The overlap processing unit 586 acquires, for instance, an average value and a median value as to the pixel values of the overlap portion, and then, sets this acquired value as a value of this pixel.

The domain block extracting unit 562 splits an original image into a plurality of domain block images having a size of "MD×ND", and then selects one arbitrary domain block image from these plural domain block images as a block image of interest. The range block extracting unit 564 selects all of range block images having a size of "MR×NR" from a block image having a size of "G×G" containing the domain block image extracted from the domain block extracting unit 562. The reduced range block forming unit 566 reduces all of the range block images produced by the range block extracting unit 564 to obtain reduced range block images having the same sizes of MD×ND as that of the domain block images, respectively, by employing the known method such as, for instance, the linear interpolation method and the projection method. The similarity judging unit 568 selects such a reduced range block image which owns the highest similarity with respect to the main block image extracted by the domain block extracting unit 562 from the reduced range block images which are produced by the reduced range block forming unit 566, and then, sets this selected reduced range block image as the "highest similarity range block image (optimum range block image)." For instance, the similarity judging unit 568 selects such a reduced range block image having both a pixel value and a pattern, which are resembled in the highest similarity as an entire reduced range block to those of the extracted domain block image.

The enlarged range block forming unit 570 forms an enlarged range block image by employing the known method such as, for example, the linear interpolation method and the projection method in such a manner that as to the domain block image extracted by the domain block extracting unit 562, the highest similarity range block image selected by the similarity judging unit 568 is enlarged to be a size "rD" (namely, enlarging block unit), and furthermore, the pixel value thereof is again converted based upon a relationship (namely, resemblant relationship in this example) between the domain block image and the range block image. As a result, the enlarged range block forming unit 570 allocates this formed enlarged range block image as an enlarged block image with respect to the domain block image. In other words, while the image enlarging process unit 56 owns such a relationship of rD>R>D with respect to the enlarging ratio "r", this image enlarging process unit 56 acquires such an enlarged range block obtained by enlarging the range block image by utilizing a relationship between each of the domain block images and range block images which are located in the vicinity of this domain block image. Then, the image enlarging process unit 56 replaces this enlarged range block image with an enlarged domain block image, so that the block images are enlarge-processed.

First, as a first example of this embodiment, the following explanation will now be made. That is, the domain block extracting unit 562 extracts a domain block image having a size of MD×ND=2×2 (domain size D=2) every one process operation, and shifts the domain block image by one pixel along either the main scanning direction or the sub-scanning direction every time the overlap process operation is carried out, whereas the range block extracting unit 564 forms such a range block image having a size of MR×NR=3×3 (range size R=3) which is smaller than an enlarged domain block image (MD2×ND2=4×4) by the enlarging ratio r=2 with respect to the extracted domain block image. In other words, such a process operation is executed four times for all of overlap portions, in which a domain block image having a size of 2×2 (domain size D=2) is enlarged to obtain a block image having a size of 4×4, and this enlarged block image is allocated to corresponding positions of a two-times enlarged image. It should be noted that the below-mentioned first to fifth embodiments are more specifically suitable as an enlarging method as to a gray image. Alternatively, similar process operation may be carried out with respect to a color image. In this case, the following method may be employed in which as to the respective color data (for example, R, G, B) indicative of this color image, color images corresponding to such a gray image having, for example, 256 gradation are formed, and then each of these color images is enlarged, and finally the enlarged color images are combined with each other.

Figure 3:
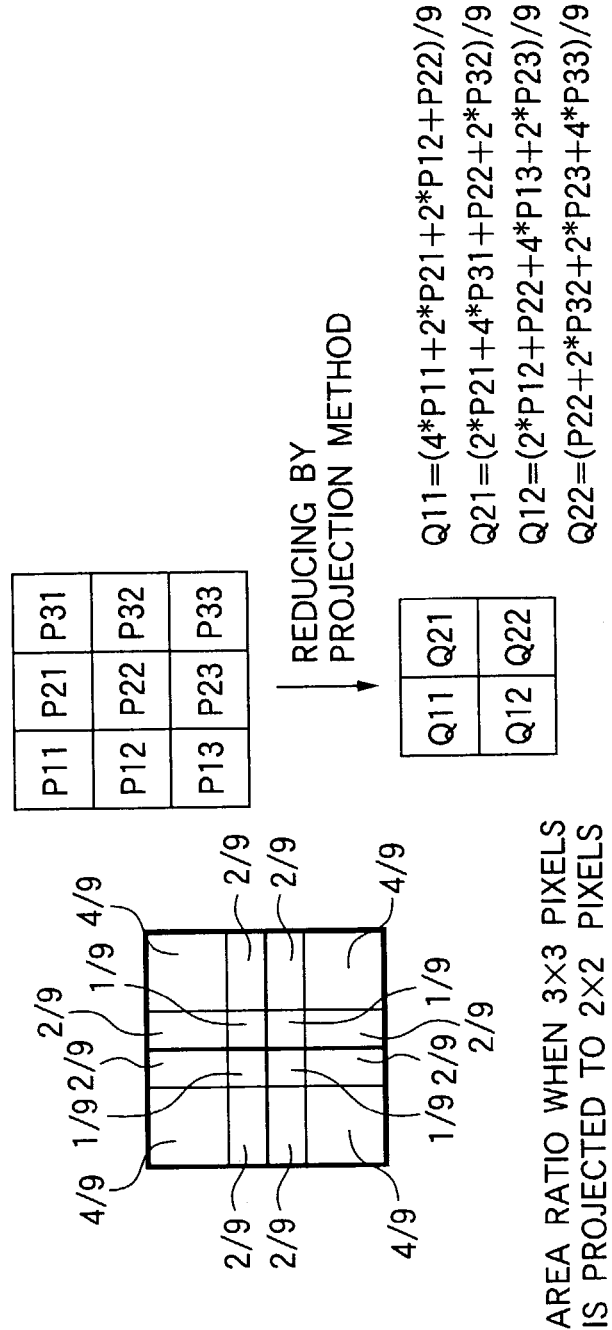
FIG. 3 is a diagram for explaining process operation executed in the case that the projection method is employed in a reduced range block forming unit.

FIG. 3 is an explanatory diagram for explaining an example of process operations (in the case that projection method is employed) executed in the reduced range block forming unit 566. The reduced range block forming unit 566 reduces all of range block images each having a size of 3×3 which are produced by the range block extracting unit 564 by way of the projection method into reduced range block images each having the same size of 2×2 as that of each of the domain block images by the reduced range block forming unit 566. For example as indicated in the drawing, the range block images are reduced by way of the projection method by weight-adding a pixel value based upon an area ratio when the size of 3×3 is projected into the size of 2×2. In such a case that the pixel values of the size of 3×3 are P11, P21, P31, P12, P22, P32, P13, P23 and P33, and also the pixel values of the size of 2×2 after reduction are Q11, Q21, Q12, and Q22, these reduced pixel values of Q11, Q21, Q12, Q22 are given by the following formula (1). It should be also noted that when the pixel size of 3×3 is reduced to the pixel size of 2×2, the same pixel values are obtained even in the projection method and the linear integration method.

$$Q11=(4*P11+2*P21+2*P12+P22)/9$$

$$Q21=(2*P21+4*P31+P22+2*P32)/9 \quad (1)$$

$$Q12=(2*P12+P22+4*P13+2*P23)/9$$

$$Q22=(P22+2*P32+2*P23+4*P33)/9$$

Figure 4:
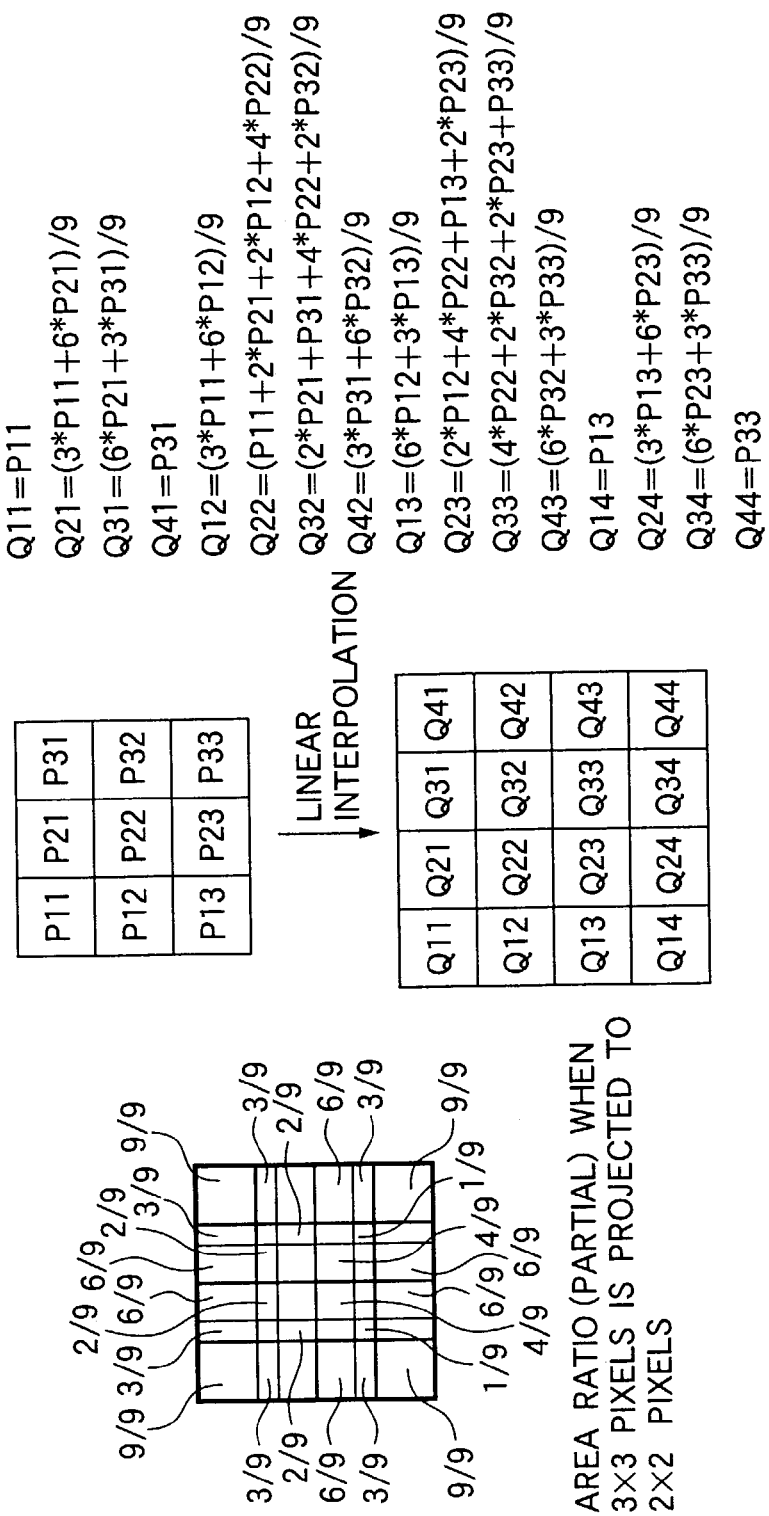
FIG. 4 is a diagram for explaining process operation executed in the case that the projection method is employed in an enlarged range block forming unit.

FIG. 4 is an explanatory diagram for explaining one example of processing operation (in the case that projection method is employed) executed in the enlarged range block forming unit 570. The enlarged range block forming unit 570 performs an enlarging calculation by the projection method in such a manner that while the enlarged range block forming unit 570 employs an area ratio when the highest similarity range block image having a size of 3×3 selected by the similarity judging unit 568 is projected into a size of rD=4×4, for instance, as illustrated in this drawing, pixel values are weight-added based upon an area ratio in the case that the pixel size of 3×3 is projected into the pixel size of 4×4. In the case that the pixel values of the size 3×3 are P11, P21, P31, P12, P22, P32, P13, P23, P33 whereas the pixel values of size 4×4 after the enlarging operation are Q11, Q21, Q31, Q41, Q12, Q22, Q32, Q42, Q13, Q23, Q33, Q43, Q14, Q24, Q34, Q44, pixel values after the enlarging operation are given by the following formula (2):

$$Q11=P11$$

$$Q21=(3*P11+6*P21)/9$$

$$Q31=(6*P21+3*P31)/9$$

$$Q41=P31$$

$$Q12=(3*P11+6*P12)/9$$

$$Q22=(P11+2*P21+2*P12+4*P22)/9$$

$$Q32=(2*P21+P31+4*P22+2*P32)/9$$

$$Q42=(3*P31+6*P32)/9$$

$$Q13=(6*P12+3*P13)/9 \quad (2)$$

$$Q23=(2*P12+4*P22+P13+2*P23)/9$$

$$Q33=(4*P22+2*P32+2*P23+P33)/9$$

$$Q43=(6*P32+3*P33)/9$$

$$Q14=P13$$

$$Q24=(3*P13+6*P23)/9$$

$$Q34=(6*P23+3*P33)/9$$

$$Q44=P33$$

Figure 5:
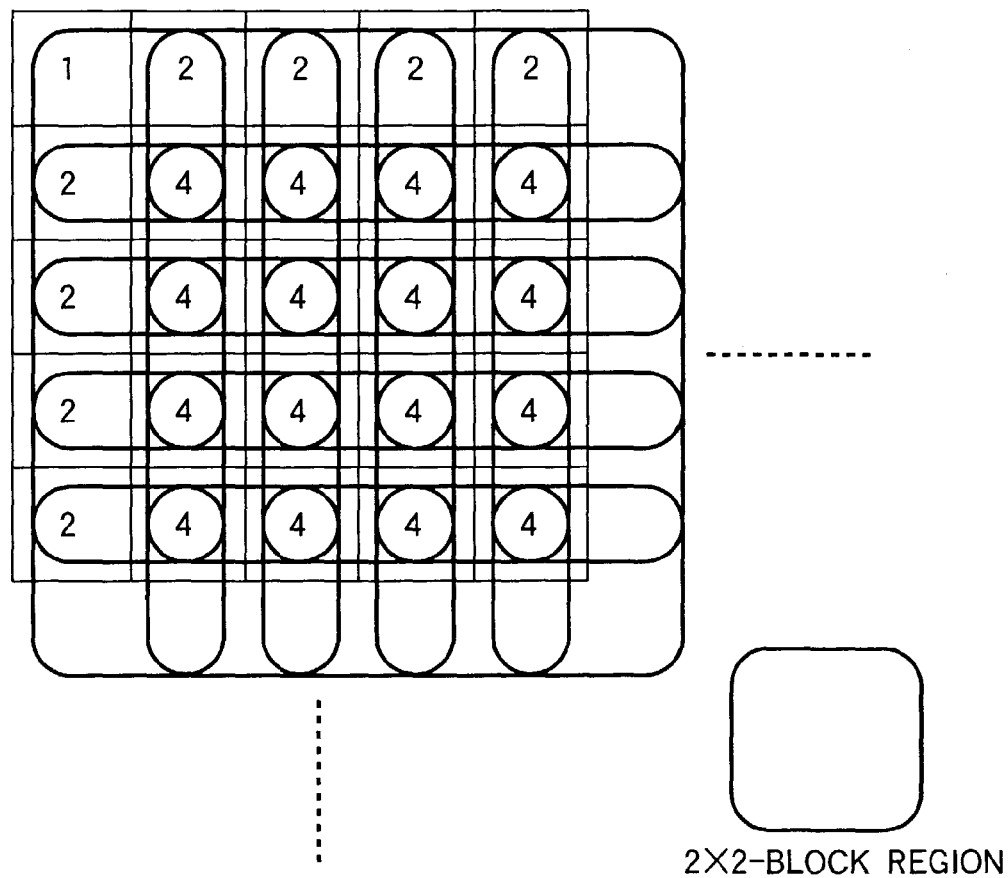
FIG. 5 is a diagram for indicating one example of overlap amounts of enlarged pixel values in the case of an overlap process operation.

FIG. 5 is a diagram for indicating one example of overlapping amounts of pixel values after enlarging operation in the case that the overlap process operation is carried out. In this example, such an overlap process operation is carried out in which a domain block image is shifted by 1 pixel along either the main scanning operation or the sub-scanning operation. In accordance with the overlap process operation of this example, when a domain block image is extracted and then a process operation (will be explained later) is performed with respect to all of the domain block images, overlapping amounts of the domain block images in the original image are given as shown in FIG. 5. The overlap processing unit 586 projects these values to the corresponding positions in the enlarged image, and outputs such an image as a final enlarged image into the image data output unit 59, while this image is obtained by dividing such a value stored in an enlarged image memory region of the image data storing unit 54 by these values.

Figure 6A:
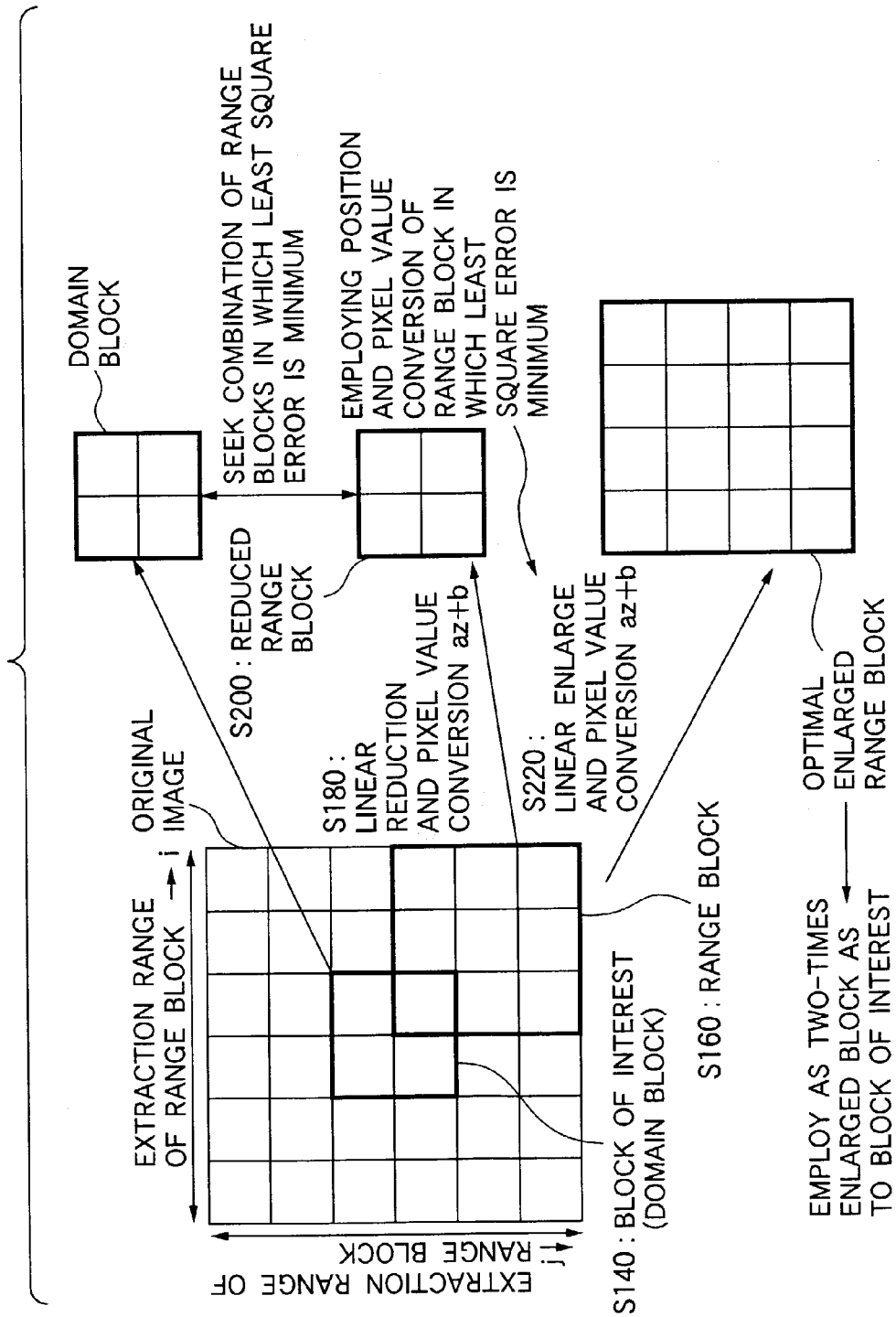
FIG. 6 is a diagram for explaining process sequence operations in an image processing apparatus according to a first embodiment by considering an image enlarging process operation.

FIG. 6 is an explanatory diagram for explaining a process sequence executed in the image processing apparatus 5 according to the above-described first embodiment, more specifically, such a process sequence that an image enlarging process operation executed in the image enlarging process operation 56 is interested. FIG. 6(A) indicates a diagram for showing one example of a domain block image, a range block image, a reduced range block image, and an enlarged range block image, whereas FIG. 6(B) is a flow chart for describing a first example of the process sequence.

First of all, as an initial condition for starting the enlarging process operation, it is so assumed that subject image data which has been acquired by the image data acquiring unit 52 and will be enlarge-processed has been previously stored in the image data storing unit 54. Under such an initial condition, the image enlarging process unit 56 firstly secures a memory region in the image data storing unit 54 for a preparation of the enlarging process operation, and initializes this memory region by "0", which is used to store an image enlarged by "r" times (two times in this example) (step S100).

Also, the image enlarging process unit 56 sets an initial parameter. As this initial parameter, there are, for instance, an enlarging ratio, a block image size for reading an image, a total calculation process time for performing an overlap process operation, and an image readout starting offset every process operation. In this embodiment, the following items are set: the enlarging ratio=2 times; the domain block image size=2×2 pixels; the range block image size=3×3 pixels; horizontal-direction offset for starting image reading operation=1 pixel; vertical-direction offset for starting image reading operation=1 pixel; and also the total overlap calculation processing time=2 times for main/sub-scanning directions.

Next, the domain block extracting unit 562 extracts all of domain block images having a size of 2×2 from an original image (step S120), and then, selects one arbitrary block image from these extracted domain block images to set this selected block image as a block image of interest (step S140).

Next, the range block extracting unit 564 extracts such a range block image having a size of 3×3 from an area in the vicinity of the block image of interest (namely, one of domain block images) as to the block image of interest (step S160). In this case, the range block extracting unit 564 extracts this range block image having the size of 3×3 in such a manner that at least one pixel among a plurality of pixels contained in the range block image is involved in the domain block image, namely, the domain block image is overlapped with the range block image. Concretely speaking, as indicated in FIG. 6(A), the range block extracting unit 564 selects all of the range block images (16 range block images in total in this example) which contain at least one pixel within the block image of interest from the peripheral block images having the size of 6×6 which surround the domain block image (block image of interest).

Next, the reduced range block forming unit 566 processes all of the range block images having the size of 3×3 which have been selected by the range block extracting unit 564 by using either the projection method or the linear interpolation method so as to produce each of reduced range block images having a size of 2×2 (step S180).

Next, the similarity judging unit 568 compares the domain block image with each of the reduced range blocks to judge a similarity. For example, the similarity judging unit 568 converts pixel values with respect to the reduced range block image formed by the reduced range block forming unit 566 so as to select such a reduced range block image having a pixel value and a pattern, which are the most similar to those of the domain block image, and then sets such a range block image corresponding to this selected reduced range block image, that is, sets the range block image which is an original image of this selected reduced range block image as the highest similarity range block image (step S200). For instance, as to the pixel values d11, d21, d12, and d22 of the domain block image, a calculation is made of a pixel average value $Dv=(d11+d21+d12+d22)/4$, and pixel standard deviation $VDv=\Sigma (dij-Dv)^2$ (symbols "i" and "j" indicate pixel positions). Subsequently, with respect to pixel values r11k, r21k, r12k, r22k (symbol "k" indicates a reduced range block image; k=1, - - -, 16) of all of the reduced range block images, a calculation is made of both a pixel average value $Rvk=(r11k+r21k+r12k+r22k)/4$ and pixel standard deviation $VRvk=\Sigma (rijk-Rvk)^2$.

Next, a calculation is made of conversion coefficients "ak", "bk", and a conversion error $Ek=\Sigma (dij-ak*rijk-bk)^2$. The above-described conversion coefficients "ak" and "bk" are employed when the respective pixel values of the reduced range block images are least-square-approximated to pixel values of the corresponding domain block image by a linear transformation "az+b." In the least squares method, the conversion coefficients "ak", "bk", and the conversion error "Ek" may be directly calculated in accordance with the below-mentioned calculation formula (3):

$$ak=(\Sigma (rijk-Rvk))*(dijk-Dv))/VRvk$$

$$bk=Dv-ak*Rvk$$

$$Ek=VDv-ak*ak*VRvk \quad (3)$$

In this case, as to the value of this conversion coefficient "ak", a constant range may be uniformly employed irrespective of complex degrees of images within the range block having the size of 3×3. Alternatively, the similarity judging unit 568 may judge a similarity with reference to a complex degree of the range block image judged by the complex degree judging unit 569. For example, a limitation may be provided in an allowable value of the conversion coefficient "ak" in response to a complex degree of an image within a range block image. This reason is given as follows. That is, when an image contained in a range block image is complex and contains a large amount of high frequency components, if this image is employed as a range block image, then an artifact component is produced in an enlarged image. As a result, the more the image becomes complex, the less the referring degree of this complex image is preferably reduced. As a consequence, in the case that a limitation is made, for example, the below-mentioned limitation may be employed. In other words, when the 3×3 pixels are expressed by (q11, q12, q13, q21, q22, q23, q31, q32, q33), if the below-mentioned formula (4-1) is established with respect to the respective m=1, 2, 3, and qm1, qm2, am3, then "1" is added to a counter "C" every time the formula (4-1) is established. Similarly, if the below-mentioned formula (4-2) is established with respect to the respective q1m, q2m, q3m, then "1" is added to the counter "C" every time the formula (4-2) is established. This method corresponds to one of such methods capable of checking as to whether or not large amounts of peaks and valleys contained in the 3×3 pixels are present. Alternatively, other similar manners may be employed.

$$(qm1-qm2)*(qm2-qm3)<0 \quad (4-1)$$

$$(q1m-q2m)*(q2m-q3m)<0 \quad (4-2)$$

In this case, a judgment is made as to whether or not the previously-calculated conversion variable "ak" is located within the allowable range by employing the obtained value "C". In this example, as one example, the below-mentioned condition formula (5) is employed.

in case of C=0 $-1.8 \leq ak \leq 2.2$ in case of C=1, 2 $-1.0 \leq ak \leq 20$ (5)

in case of C=3 $0 \leq ak \leq 2,0$ in case of C=4, 5, 6, $0 < ak < 0$

In this case, the similarity judging unit 568 judges the similarity in such a manner that the larger the range block image contains the high frequency components, the smaller the contribution degree of this range block image is decreased. For example, in the case that both the value "C" and the conversion coefficient "ak" cannot satisfy the condition formula (5), the similarity judging unit 568 excludes this range block image from the subject for comparing the least square errors. Also, in this case, when the value C=4, 5, and 6, since any value of "a" is not essentially allowed, such a range block image may be excluded from the beginning without calculating the conversion coefficient "ak."

Next, the similarity judging unit 568 calculates a value "C" of a range block image corresponding to each of the conversion coefficients "ak" (k=1, - - -, 16), and checks as to whether or not the conversion coefficient "ak" is in an allowable range, and then collects only such conversion coefficients "ak" in the allowable range so as to define them as a set "G". Then, assuming now that E=min {Ek|k∈G}, a=ak and b=bk are set with respect to such a "k" where E=Ek. A range block image indicated by this "k" constitutes such a range block image, which is the most similar to the domain block image.

It should also be understood that since conversion coefficient "bk" is not practically required to determine "Ek", such a "k" that Ek becomes minimum is obtained and the conversion coefficient "ak" is finally determined, and thereafter, this conversion coefficient "bk" may be calculated. Also, as the conversion coefficient "bk", instead of the constant value shown in the formula (3), values given by the below-mentioned formula (6) may be employed. This formula (6) owns such an effect that error components between the reduced range block image and the domain block image every pixel contained in the reduced range block image are corrected (namely, being superimposed in this example). In this case, pixel value of the corresponding pixel of the domain block image is "dij", and also pixel value of the corresponding pixel of the reduced range block image is "rijk". When the conversion coefficient "bk" is calculated based upon this formula (6), the error every fine pixel can be suppressed, so that reproducibility of the original image in the enlarged image can be furthermore improved. It should be noted that the reason why "bijk" is written is given by that values are different from each other every each pixel contained in the domain block image.

$bk=bijk=dij-ak*rijk$ (6)

In the case that a domain block image is simply compared with a reduced range block image, information about an original range block image is not always considered. As a result, in such a case that a high-frequency concave/convex image portion, which is not suitable for enlargement, is contained in an employed range block image, the noise thereof is emphasized due to pixel value conversion, so that the noise would be increased. On the other hand, as explained above, when the-allowable conversion coefficient "ak" is restricted in response to the complex degree of the range block image, the occurrence of the noise can be prevented.

Next, the enlarged range block forming unit 570 enlarges the highest similarity range block image having the size of 3×3 selected by the similarity judging unit 568 to have an enlarged domain size, namely a size of 4×4 by employing, for instance, the linear interpolation method and the projection method (step S220). Next, the enlarged range block forming unit 570 forms an enlarged range block image by reconverting the pixel value of the image which has been converted in the size of 4×4 based upon the relationship between the domain block image and the range block image, and as a result, produces such a block image (enlarged domain block image) having a size of 4×4 by enlarging the domain block image having the size of 2×2 in an enlarging ratio of "r" times (two times in this example). Fox instance, the enlarged range block forming unit 570 executes a pixel value conversion "az+b" based upon the conversion coefficients "a" and "b" obtained in the similarity judging unit 568 with respect to all pixels "z" of the enlarged image having the size of 4×4, and sets the resultant image as an enlarged domain block image (being equal to enlarged range block image). At this time, the enlarged range block forming unit 570 may preferably determine pixel values of the enlarged range block image with reference to the complex degree of the range block image judged by the complex degree judging unit 569. For example, a limitation may be set to the range of the value of the coefficient "a" used in the pixel value conversion. The larger a range block image contains the high frequency components, the smaller the contribution degree of this range block image may be reduced.

Thereafter, the enlarged range block forming unit 570 adds all of the pixel values of this enlarged domain block image having the size of 4×4 to the positions corresponding to the domain block images in the memory region for storing the enlarged image data within the image data storing unit 54. In the case that the error component is superimposed to the value "bk" in the similarity judging process operation executed in the similarity judging unit 568, the conversion coefficients "bk" which have been allocated to the respective dot positions of the domain block image are projected and are switched every dot in this enlarging stage.

Next, the image enlarging process unit 56 judges as to whether or not the above-described process operations have been carried out with respect to all of the domain block images (step S240). Then, when there is such a domain block image to which the process operations have not yet been performed, the process operation is returned to the previous step S140 in which the block image of interest is set to another domain block image. Then, the process operations defined from the step S160 to the step S220 are repeatedly carried out ("No" in step S240). On the other hand, when the above-described process operations have been accomplished with respect to all of the domain block images ("YES" in step S240), an enlarged image corresponding to the original image is stored in the enlarged image data storage unit 58.

When the above-described process operations have been accomplished with respect to all of the block images ("YES" in step S240), the image enlarging processing unit 56 checks a total calculation time of the overlapping process operations (step S300). Then, if the checked calculation time is not reached to the set calculation time, then the process operations defined from the step S120 is again commenced from such a position that the image readout starting offset is added to a head address of an image ("NO" in step S300). In other words, every time the process operation is returned to the step S120, the domain block extracting unit 562 sequentially adds the image readout starting offset to the head address of the image, and reads out domain block images in the set domain block image size from such a position that the offset is added to the head address of the image stored in the image data storage unit 54, and then sets any one of these read domain block images as a block image of interest. Subsequently, other units repeatedly execute process operations similar to the above-explained process operations.

On the other hand, in such a case that while the total, calculation time of the overlap process operation has been set to 2 times or more than 2 times, a total time of a series of the above-explained process operations is reached to the set overlap calculation time ("YES" in step S300), the overlap processing unit 586 executes such an averaging process operation that this overlap processing unit 585 calculates an average value of images (repeated portions), which have been processed/repeated in connection with the overlap process operation, with reference to the weight values of the respective pixels indicated in FIG. 5, and sets the calculated average value as a value of this pixel (step S320).

It should also be noted that when "1" is set as the total calculation time of the overlap process operation, namely when it is so set that the overlap process operation is not carried out, the above-explained averaging process operation is no longer required, and one sheet of enlarged image read out from the enlarged image data storing unit 58 is directly outputted. In other words, only when it is so set that the overlap process operation is executed, the image enlarging process unit 56 may acquire a finally enlarged image in such a manner that the image enlarge processing unit 56 performs the enlarging process operation plural times by shifting the readout starting position of the block image with respect to the original image, and as to the repeated pixels, the average value thereof are set as the pixel data. As a consequence, block image distortions can be reduced.

In the above-explained example, every time the overlap process operation is carried out, the process operations defined from the step S120 have been repeatedly carried out. Alternatively, the process operations defined from the step S100 may be again repeatedly carried out. In this alternative case, a memory region for storing an enlarged image is secured in the image data storage unit 54 in correspondence with each of the overlap process operations. Then, when each of the enlarged images is acquired, the respective enlarged images are read out from the enlarged image data storing unit 58 when the averaging process operation is carried out, the image enlarging process unit 56 may calculate an average value of images (superimposed portions) which have been processed/superimposed in connection with the overlap process operation with reference to the weighted values of the respective pixels shown in FIG. 5, and then, may set this calculated average value as a value of this pixel.

Figure 7:
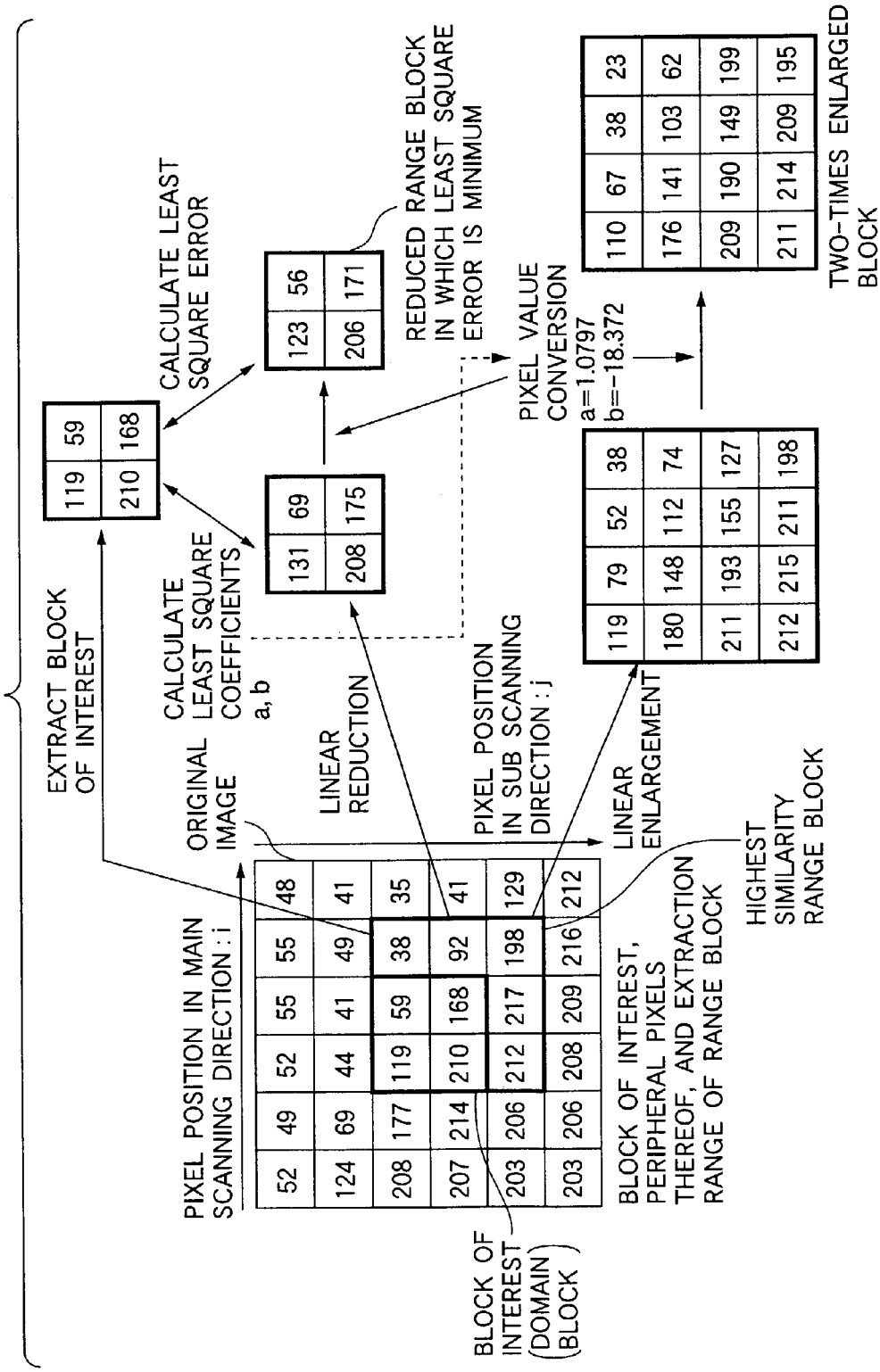
FIG. 7 is a diagram for indicating one embodiment of process operations according to the first embodiment up to a prestage of the overlap process operation.

FIG. 7 is a diagram for indicating one embodiment of the process operations according to the above-explained first embodiment, and represents such process operations until an end of a step S240 corresponding to a prestage of the overlapping process operation. That is, in this process operation, an enlarging process operation is carried out in the enlarging ratio of 2 as to a domain block image having a size of 2×2 pixels (domain size D=2), and a range block image having a size of 3×3 pixels (range size R=3);

$r*D=2*2=4,$ $R=3, D=2,$ and such a relationship of r*D>R>D can be satisfied.

In accordance with the image processing apparatus 5 of the first embodiment, the resultant enlarged image may have the steepness of the edge by the fractal method, and also the smoothness achieved in the interpolation calculation (linear interpolation method in above example) used when the pixel values of the enlarged image are obtained, and the enlarged image having the high image quality can be produced. In other words, in the conventional interpolating/enlarging method, for example, the block image of interest having the size of 2×2 pixels is enlarged into the block image having the size of the 4×4 pixels without stopping, whereas in the first embodiment, the range block image having the size of 3×3 pixels, which is located in the vicinity of the block image of interest having the size of 2×2 pixels, is enlarged into the range block image having the size of 4×4 pixels, which is utilized as the enlarged image of the block image of interest. As a result, the magnification in the actual enlarging process operation is decreased, so that the image blurring phenomenon can be reduced, as compared with that by the conventional interpolating/enlarging method. Also, such a technical point for utilizing a domain block and a range block corresponds to the process operation similar to the conventional fractal enlarging method. As a result, while the feature of the fractal concept may be utilized, the enlarged image having the less blurring phenomenon can be produced by suppressing the occurrences of jaggy and of block distortion. In addition, since the range block image having the size of 3×3 pixels is enlarged into the range block image having the size of 4×4 pixels, the burring effect may be slightly utilized. As a result, it can avoid the occurrence of noise-shaped trash and oozing of the splinter-shaped pixel value-at the step edge portion, which have occurred in the conventional fractal enlarging method.

Also, since the process operation is carried out with maintaining such a relationship of D<R<rD, namely, the similarity is judged by the size of 3×3 with respect to the size of 2×2, the reproducibility of the busy portion may be improved, as compared with the conventional fractal enlarging process operation. This reproducibility is made based upon such a fact that, for instance, as to D=2, R=3 may seek a pattern close to "D" rather than R=4. This reproducibility is not limited to the busy portion. However, a large effect may be expected in such a portion that textures are mixed with each other which is like a busy portion.

Also, in the first embodiment, since the range block image having the size of 3×3 pixels located in the vicinity of the block image of interest is enlarged to the range block image having the size of 4×4 pixels, and the pixel value conversion is performed based upon the relationship between the domain block and the range block so as to obtain the pixel values of the final enlarged range block image, such an enlarged image which can be sufficiently viewed can be produced by merely executing the pixel value calculating process operation of the enlarged image only one time. In addition, the area in the vicinity of the domain block is selected as the seeking range of the range block, namely, the seeking range of the range block is narrow, so that the processing speed may be furthermore shortened. In other words, in the enlarging method by using the fractal coding system, the repetition process operation is carried out so as to obtain the enlarged image, so that very long processing time is required. To the contrary, in accordance with the image enlarging process unit 56 of the first embodiment, the processing time required until the enlarged image can be obtained can be considerably shortened, as compared with the fractal coding system.

Also, the technical point of this first embodiment is featured by that since the seeking range of the range block image is limited to the area in the vicinity of the domain block, the seeking process time of the range block may be reduced. This technical feature is largely different from the method disclosed in Japanese Laid-open Patent Application No. Hei-11-8758 In other words, the setting range of the range block according to the first embodiment is established based upon such an assumption of an image continuous characteristic, namely, a range block image resembled to a domain block image is located in very close to the domain block along the same direction, and there are grounds as to the image quality in limiting of the range block image seeking range. As a consequence, such a risk for conducting a deterioration of an image quality can be considerably lowered.

As explained above, in accordance with the image processing apparatus 5 of the first embodiment, while the processing time required to obtain the visibly-allowable enlarged image is not made so long, the occurrence of jaggy can be suppressed and the enlarged image having less blurring components can be obtained. At the same time, since the enlarging process operation with respect to the range block image is employed, it is possible to avoid the occurrence of the noise-shaped trash and oozing of the splinter-shaped pixel value with respect to such a binary image as a document image. In other words, while the balance with respect to the processing time is considered, the deterioration in the image quality of the visible image can be prevented and also the image can be enlarged by avoiding that the noise-shaped trash is produced, and the occurrence of oozing of the splinter-shaped pixel value.

FIG. 8 is a block diagram for indicating a detailed structure of the image enlarging process unit 56 of the image processing apparatus 5 according to a second embodiment of the present invention. In the second embodiment, such an enlarge repeating process operation is executed that a designated enlarging ratio is divided (each of divided enlarging ratio is larger than, or equal to "1") so as to produce a combination of the subdivided enlarging ratios, and the respective subdivided enlarging ratios are sequentially applied (enlarging/repeating process). Also, when this enlarging repeating process operation is carried out, a size of at least one of both a domain block image and a range block image is changed in response to each of the enlarging ratios, and then, the above-explained enlarging process operation is carried out based upon the respective enlarging ratios. Therefore, the image enlarging process unit 56 of the second embodiment includes an enlarging ratio dividing unit 561 for dividing the designated enlarging ratio into a combination of the smaller divided enlarging ratios. In the case that the designated enlarging ratio is divided into the smaller divided enlarging ratios, the image enlarging process unit 56 performs such an enlarging repeating process operation that a predetermined image processing method (will be discussed later) is sequentially applied every divided enlarging ratio.

FIG. 9 is a diagram for illustrating one example of combinations of enlarging ratios divided by the enlarging ratio dividing unit 561. In this example shown in FIG. 9, as to such a designated enlarging ratio (for instance, designated enlarging ratio is 6, 8, 9 etc.) which may be expressed by a product of two values among the designated enlarging ratios, it is divided into two enlarging ratios. In the enlarging ratio dividing unit 561, this combination of the enlarging ratios is previously prepared as table data so that the enlarging ratio dividing unit 561 may utilize this table data. Alternatively, the enlarging ratio dividing unit 561 may calculate this combination of these enlarging ratios every time it is required. Alternatively, although the designated enlarging ratio is divided into the two enlarging ratios in this illustrated example, this designated enlarging ratio may be divided into three, or more enlarging ratios. For instance, when the designated enlarging ratio is equal to "12", this designated enlarging ratio is not divided into two enlarging ratios of "3" and "4", but may be divided into three enlarging ratios of "2", "2" and "3." Also, in this embodiment, when an image is basically enlarged by two times, the most effective effect may be achieved. When an image is enlarged by $2^n$ times, such a process operation that two-times magnification is repeated "n" times is the best process operation. It should be noted that a detailed explanation as to "combination of magnifications for realizing the highest image qualities" will be made with reference to a fifth embodiment. As previously explained, in the case that an enlarging ratio "K" designated by a user, or the like is large, if such an enlarging repeating process operation is carried out in which the enlarging ratio "K" is subdivided into a combination of smaller enlarging ratios, and the respective divided enlarging ratios are successively applied, then a mosaic-shaped (block-image-shaped) image deterioration which may occur when the magnification is large can be reduced.

Figure 10:
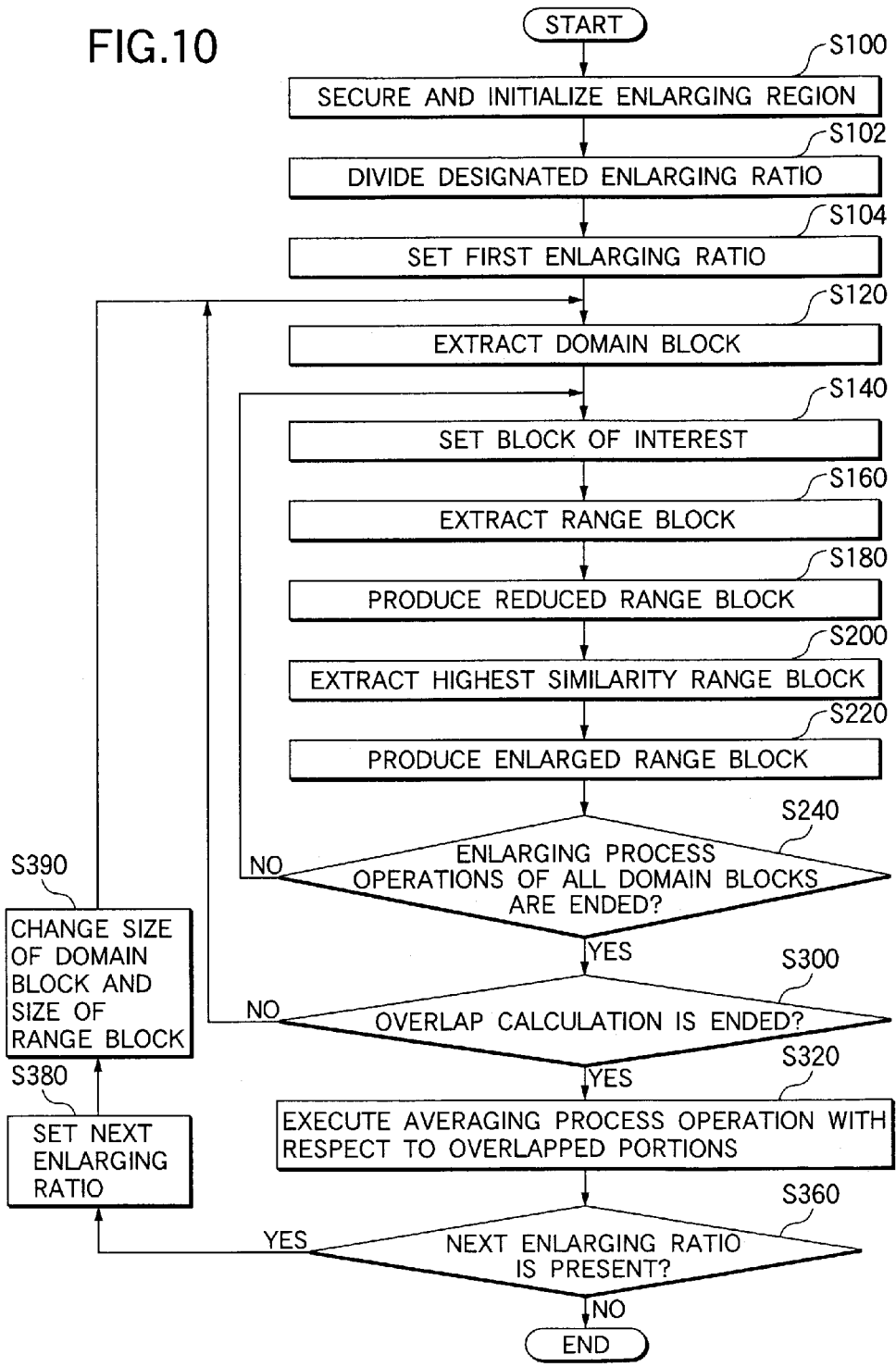
FIG. 10 is a flow chart for describing process sequence operations executed in an image processing apparatus according to a second embodiment.

FIG. 10 is a flow chart for describing process sequential operations executed in the image processing apparatus 5 of the second embodiment. The image enlarging process unit 56 firstly divides a designated enlarging ratio "r" so as to produce a combination of the divided enlarging ratios (step S102), and then sets a first enlarging ratio and executes a similar process operation to that of the above-described first example (step S104). For example, among the designated enlarging ratios, such an enlarging ratio which can be expressed by a product of two values (e.g., designated enlarging ratio is 6, 8, 9 and so on) is divided into two enlarging ratios.

Next, the process operation of the image processing apparatus 5 is explained with reference to such an example that after a two-times enlarged image (image enlarged by two times) has been formed by way of the above-described first embodiment, this enlarged image is again enlarged in the two-times enlarging ratio so as to obtain a four-times enlarged image (image enlarged by four times) of an original image. In other words, in order to obtain a four-times enlarged image, a two-times enlarging process operation is carried out twice. Also, a description will be made of another example that both a domain size and a range size are changed in response to each of the enlarging ratios.

The image enlarging process unit 56 executes an averaging process operation in connection with an overlap process operation (step S320), and thereafter, checks as to whether or not the enlarging process operations have been accomplished based upon all of the combination elements of the enlarging ratios (step S360). If the enlarging process operations are not yet ended, then the image enlarging process operation 56 sets the next enlarging ratio ("YES" instep: S360 and step S380). The image enlarging process operation 56 performs the substantially same enlarging process operation as that of the first embodiment by employing the image obtained in the first enlarging process operation and the next enlarging ratio which has been set. At this time, as to both the domain block image and the range block image, sizes thereof are enlarged. For example, the size of the domain block image is enlarged to 3×3 pixels (domain size D2=3; suffix of 2 indicates second time), and also, the size of the range block image is enlarged to 4×4 pixels (range size R2=4), and then the process operation is returned to the previous step S120 (S390). It should be noted that in the respective process operations, the linear converting tables corresponding thereto are prepared in connection with the size changes in the respective block images. Also, while it is so determined that the limitation of the pixel value conversion parameter in response to the complex degree of the range block image is not executed in the second process operation, such a range of "$-1.8 \leq a \leq 2.2$" may be employed. Apparently, similar to the first embodiment (namely, first process operation), this limitation of the parameter may be alternatively made.

The reason why the size of the domain block image is enlarged to the 3×3 pixels in the second process operation is given as follows. That is, as to the two-times enlarged image which has been acquired in the first process operation, substantially no high frequency components smaller than, or equal to the 2×2 pixels are superimposed on this image. However, even when such high frequency components are superimposed to this image, it is so assumed that these high frequency components are such noise produced during the enlarging process operation in the two-times enlarging ratio. Also, when the domain block image having the size of 3×3 pixels is employed, there is such a trend that the high freqeuncy block image lower than, or equal to the size of 3×3 pixels becomes blurred after the enlarging process, which may achieve, such an, effect that the noise may be mitigated.

On the other hand, when the enlarging process operations based upon all of the combined elements are accomplished, the enlarging process operation by the image enlarging process operation is ended ("NO" in step S360). As enlarged image stored in the enlarged image data storing unit 58 is outputted via the image data output unit 59 to the print engine 70 and the display apparatus 80 in a file form.

In accordance with the above-described image enlarging method of the second embodiment, the high quality enlarging process operation of the image can be carried out without the occurrence of such an image-quality deterioration that, for instance, even when the enlarging ratio is large, the flat portion of the image becomes unnatural pictorial tone; and both the sharp edges and the blurred edges are mixed with each other in the busy region where the narrow edges are concentrated. For instance, when the image is enlarged two times in the second enlarging process operation to form the image enlarged 4 times larger than the original image, the enlarged image having the higher image quality can be formed, as compared with that of the enlarging process operation of the first embodiment. In the case that the conventional enlarging method based upon the fractal compression method is performed, when the enlarging ratio is increased, the repetition time must be increased in order to increase resolution. To the contrary, in the case of the second example manner, the enlarging process operation substantially similar to that of the first example may be merely repeated plural times equal to a total subdivision number. Therefore, the repetition process operation need not be increased at all, as explained in the fractal compression method. In other words, when the enlarging ratio is wanted to be increased, as explained in the second example, the designated enlarging ratio is divided to obtain a combination of the smaller enlarging ratios, and the images are sequentially enlarged based upon these divided enlarging ratios, so that the visually-allowable enlarged images can be obtained.

Also, in the two-times enlarging operation executed in the second time of this second example, since the domain block image having the size of 3×3 pixels (domain size D2=3) is enlarged two times and the range block image having the size of 4×4 pixels (range size R2=4) is enlarged two times, $r*D2=2*3=6$, R2=4, and D2=3, so that such a relationship of $r*D2>R2>D2$ can be satisfied. As a consequence, also in the two-times enlarging operation of the second time, similar to the two-times enlarging operation of the first time, while the image processing apparatus 5 can own the features as to the sharp characteristic of the edge by the fractal enlarging operation and the smoothness obtained by the interpolation calculation executed when the pixel value of the enlarged image is calculated, and can form the enlarged image having the high image quality.

It should also be noted that in the second embodiment, the range size employed in the enlarging process operation of second time ifs selected to be "4 (4×4 pixels)." However, the present invention is not limited to this range size, but may employ larger range sizes. For example, in the case that 3×3 pixels are employed as the size of the domain block image, 5×5 pixel size of the range block image may be alternatively combined with this size.

Figure 11:
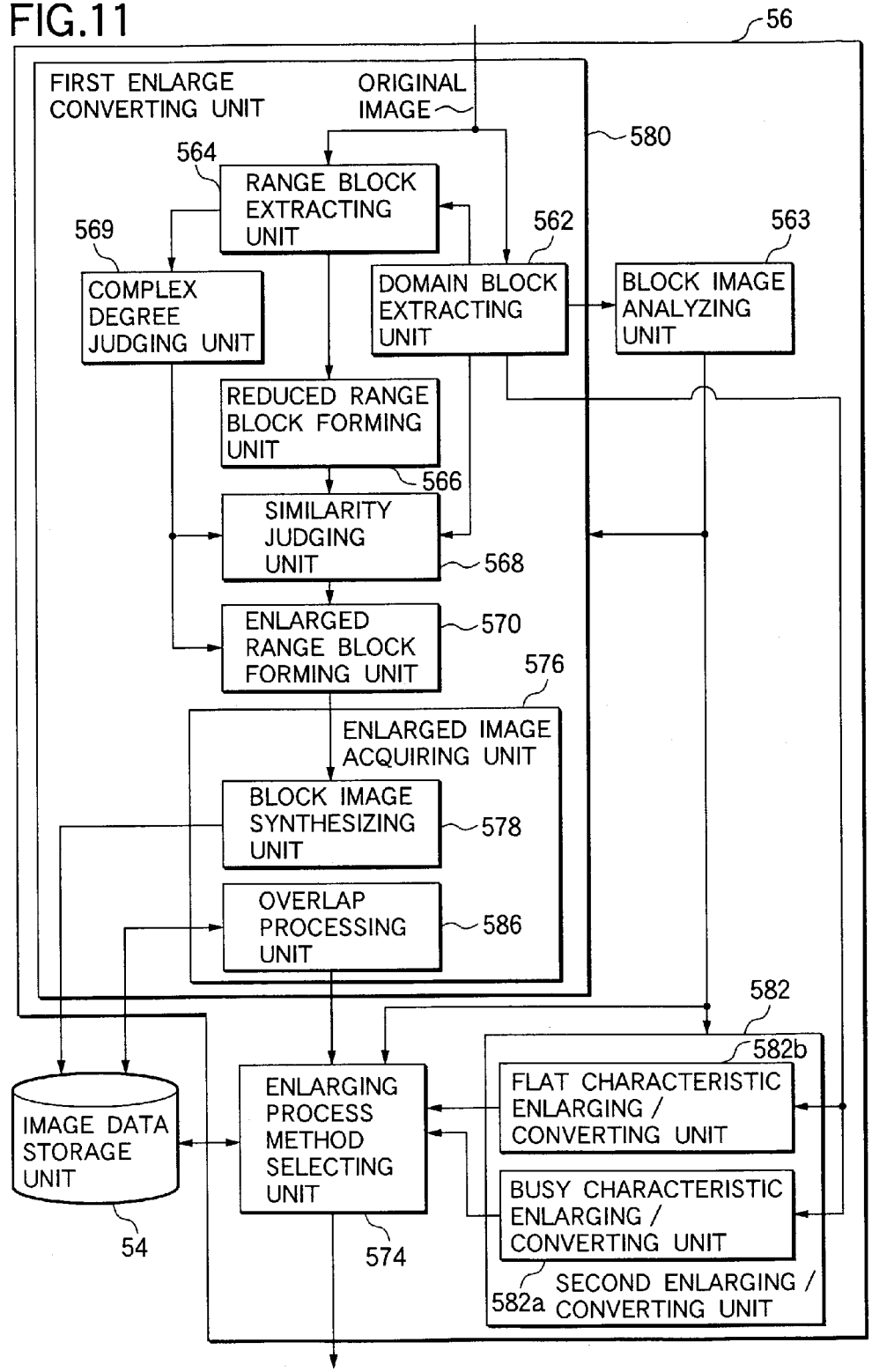
FIG. 11 is a block diagram for indicating an image enlarging process unit of a third embodiment.

FIG. 11 is a block diagram for showing a detailed internal arrangement of the image enlarging process unit 56 of the image processing 5 apparatus according to a third embodiment of the present invention. This third embodiment corresponds to such a method that an image quality can be furthermore improved by changing an enlarging process method in response to a local feature of an image to be processed. As to images enlarged in accordance with the first example and the second example, there are such cases that the enlarged images may become unnatural, depending upon a selection of a domain size "D" and a range size "R", namely, a flat image portion is further flattened to become a pictorial tone; and both clear edges and blurred edges are mixed with each other in a busy portion where fine edges are concentrated, resulting in an unnatural image. As a consequence, a more natural image may be produced by switching the enlarging methods in response to a feature of an image, or by blending resultant images.

To this end, the image enlarging process unit 56 of the third embodiment includes a first enlarge converting unit 580 and a second enlarge converting unit 582. The first enlarge converting unit 580 has a domain block extracting unit 562, a range block extracting unit 564, an enlarged range block forming unit 570, and an enlarged image acquiring unit 576. The first enlarge converting unit 580 owns a similar arrangement to that of the first embodiment, and executes an enlarge converting process operation by a fractal enlarging method. The second enlarge converting unit 582 executes an enlarge converting process operation based upon a second enlarging method which is different from the above-described fractal enlarging method. Also, the image enlarging process operation unit 56 includes a block image analyzing unit 563 and an enlarging process method selecting unit 574. The block image analyzing unit 563 analyzes as to whether or not such an image (block image) contained in a block image of interest which has been extracted/set by the domain block extracting unit 562 of the first enlarge converting unit 580 corresponds to any one of an edge characteristic and a second characteristic different from this edge characteristic. The enlarging process method selecting unit 574 selects any one of outputs from the first enlarge converting unit 580 and the second enlarge converting unit 582, namely, selects the enlarging process methods. The enlarging process method selecting unit 574 selects any one enlarging method of the fractal enlarging method by the first enlarge converting unit 580 and the second enlarging method by the second enlarge converting unit 582 based upon an image analysis result made by the block image analyzing unit 563, and then, the enlarging process operation may be executed by such an enlarge converting unit corresponding to this selected enlarging method. As a result, it is possible to eliminate such a useless work that, the individual enlarging process operation is caused to be carried out by any one of the first enlarge converting unit 580 and the second enlarge converting unit 582, which is actually not utilized.

The block image analyzing unit 563 analyzes as to whether or not a characteristic of a domain block image extracted by the domain block extracting unit 562 corresponds to any one of an edge characteristic containing an edge whose edge strength is relatively strong, a busy characteristic (texture characteristic) in which a portion where edges whose strengths are relatively weak is concentrated, corresponding to the first example of the second characteristic, and a flat characteristic which contains substantially no edge and corresponds to the second example of the second characteristic. In correspondence with this block image analyzing unit 563, the second enlarge converting unit 582 includes a busy characteristic enlarge converting unit 582a, and a flat characteristic enlarge converting unit 582b. The busy characteristic enlarge converting unit 582a performs an enlarge converting process operation by way of a manner suitable for the busy characteristic corresponding to the first example of the second enlarge method. The flat characteristic enlarge converting unit 582b executes an enlarge converting process operation by way of a manner suitable for the flat characteristic corresponding to the second example of the second enlarge method. The enlarging process method selecting unit 574 selects the output from the busy characteristic enlarge converting unit 582a when the analysis result of the block image analyzing unit 563 indicates that the feature of the domain block image is the busy characteristic, and selects the output from the flat characteristic enlarge converting unit 582h when the analysis result of the block image analyzing unit 563 indicates that the feature of the block image is the flat characteristic. The busy characteristic enlarge converting unit 582a executes such an enlarging process operation based upon, for example, the third-order convolution method as the enlarging process operation suitable for the enlarging process operation with respect to the busy portion. The flat characteristic enlarge converting unit 582b executes such an analyzing process operation based upon, for example, the linear interpolation method as the enlarging process operation suitable for the enlarging process operation with respect to the flat portion.

Figure 12:
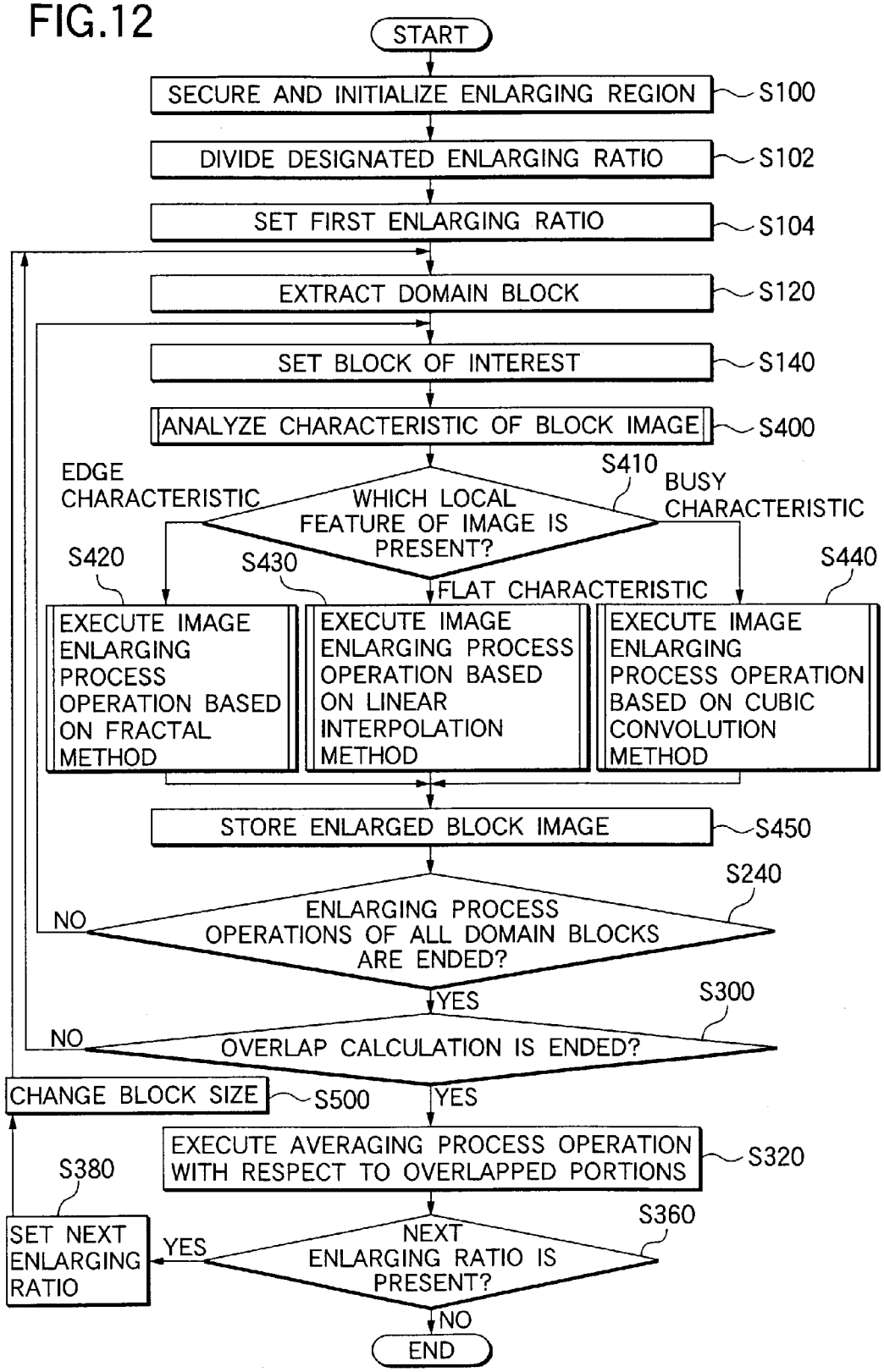
FIG. 12 is a flow chart for explaining process sequence operations executed in an image processing apparatus according to the third embodiment.

FIG. 12 is a flow chart for describing process sequence operations executed in the image processing apparatus 5 of the third embodiment. When the domain block extracting unit 562 sets a block image of interest (step S140), the block image analyzing unit 563 analyzes a feature of an image contained in this block image of interest (step S400). Then, for example, the block image analyzing unit 563 classifies the characteristic of the block image of interest into any one of the edge characteristic, the flat characteristic, and the busy characteristic (texture characteristic). For example, a so-called "stepped-edge" portion in which one piece of relatively clear edge (edge having high strength) is present such as a face contour portion is classified as the edge characteristic. Also, for instance, such a portion in which fine edges are condensed is classified as the texture characteristic. Then, the remaining portion is classified as the flat characteristic. It should be understood that a detailed process operation for analyzing the characteristic of this block image will be discussed later.

Next, the enlarging process method selecting unit 574 determines a manner of analyzing process operation based upon an image analysis result by the block image analyzing unit 563 (step S410). For instance, in the case that the image analysis result of the block image analyzing unit 563 indicates that a characteristic of a block image is the edge characteristic, the enlarging process method selecting unit 574 controls the first enlarge converting unit 580 in such a manner that either the first enlarging process operation or the second enlarging process operation is executed (step S420). Also, in such a case that the image analysis result of the block image analyzing unit 563 indicates that a characteristic of a block image is the flat characteristic, the enlarging process method selecting unit 574 controls the flat characteristic enlarge converting unit 582b to carry out the enlarging process operation by employing the linear interpolation method, which is a light process operation and can hardly cause fine noise (step S430).

Furthermore, in the case that the image analysis result of the block image analyzing unit 563 indicates that a characteristic of a block image is the busy characteristic, the enlarging process method selecting unit 574 controls the busy characteristic enlarge converting unit 582a in such a manner that the enlarging process operation is carried out by way of, for example, the third-order convolution method (step S440). The respective enlarge converting units 580, 582, 584 store the enlarged image data obtained by executing the respective enlarging process operations into the image data storing unit 54 (step S450). Subsequently, the process operations defined from the steps S140 to S450 are repeatedly carried out until the above-described process operations have been executed with respect to all of the domain block images (step S240). As a result, when a series of the above-explained process operations have been accomplished with respect to all of the domain block images, data of such an enlarged image which the enlarging process operation has been carried out in response to the feature of the image contained in the domain block image is stored in the enlarged image data storing unit 58.

Figure 13:
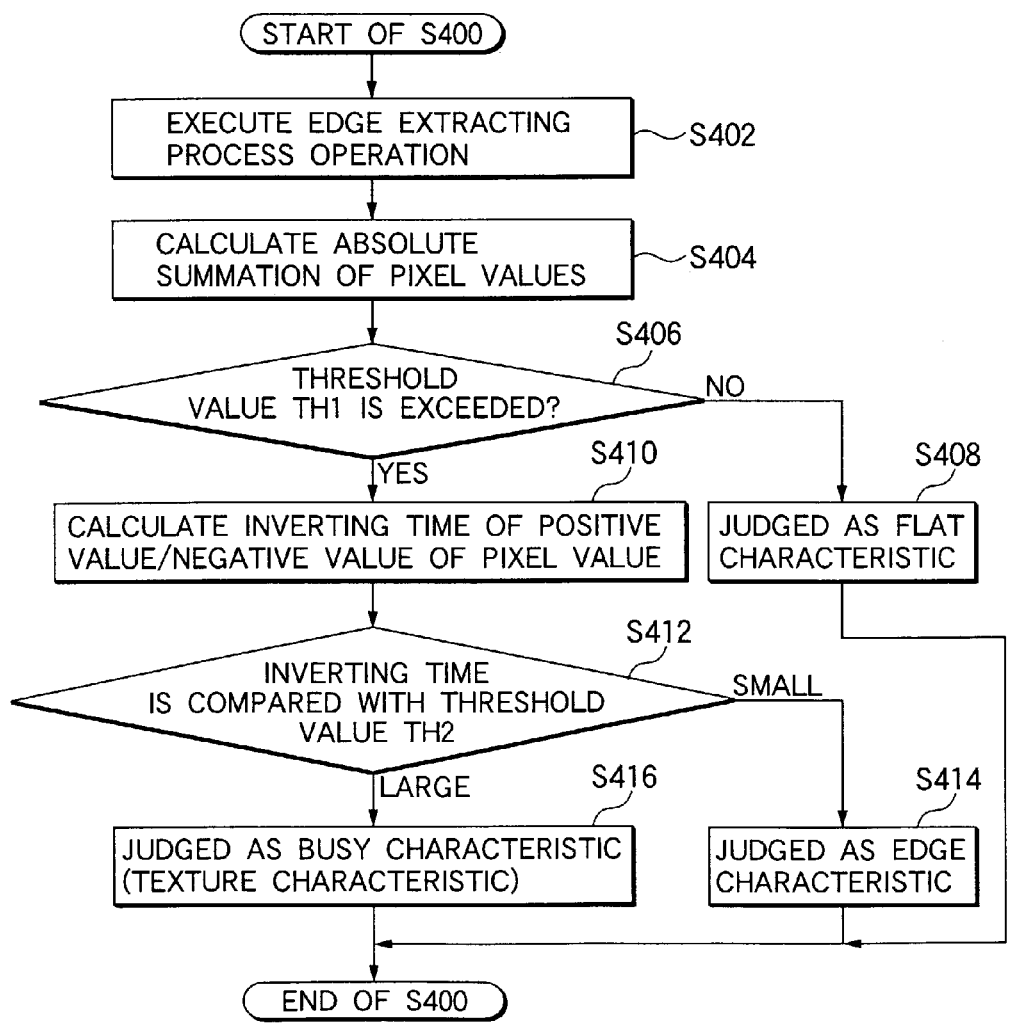
FIG. 13 is a diagram for explaining a detailed process operation of analyzing a characteristic of a block image in the process sequence operation of the third embodiment.

FIG. 13 is a diagram for explaining a detailed process operation of analyzing a characteristic of a block image, which is executed in the step S400 of the process sequence operation according to the third embodiment. FIG. 13(A) shows an example of a mask (digital filter) employed in an image analysis, and FIG. 13(B) is a flow chart for describing this process sequence operation.

First, the block image analyzing unit 563 executes an edge extracting process-operation with respect to the block image of interest which has been set by the domain block extracting unit 562 (step S402). In this edge extracting process operation, for example, an edge detecting mask (namely, edge detecting filter) as indicated in FIG. 13(A) is applied with respect to an original image while the block image of interest is set as a center, so that an edge-extracted image is obtained. It should be noted that a mask for extracting an edge is not limited to the mask example shown in FIG. 13(A), but may be realized by employing other edge extracting masks such as a Laplacian type edge detecting mask, a Sobel type edge extracting mask, and a Kirsh type edge extracting mask.

Next, the block image analyzing unit 563 calculates an absolute summation of pixel values contained in the domain block image from the edge detected result (step S404). Then, the block image analyzing unit 536 judges as to whether or not the calculated absolute summation exceeds a first threshold value "TH1" which has been previously set (step S406). When this absolute summation does not exceed the first threshold value "TH1", namely, when this absolute summation is smaller than the first threshold value TH1, the block image analyzing unit 563 judges that this block image of interest is the flat portion, namely, the feature of the block image is the flat characteristic ("NO" in step S406, and step S408).

Also, the block image analyzing unit 563 calculates a total inverting time of positive values/negative values of pixel values contained in the domain block image as to such a block image which is not judged as the flat characteristic ("YES" in step S406 and step S410). Then, the block image analyzing unit 563 compares the calculated inverting time with a previously-set second threshold value "TH2" (step S412). In such a case that the total inverting time is smaller than the second threshold value "TH2", the block image judging unit 563 judges that this block image of interest is the edge portion, namely the feature of the block image corresponds to the edge characteristic (step S414). To the contrary, in such a case that the total inverting time is larger than the second threshold value "TH2", the block image judging unit 563 judges that this block image of interest is the texture portion, namely the feature of the block image corresponds to the busy characteristic (step S416). As a consequence, the block image analyzing unit 563 can distinguish such a portion whose edge is, relatively clear (like a contour portion of a face) from another portion in which fine edges are concentrated. Since such a manner is employed, the image enlarging process unit 56 of the third embodiment can execute the enlarging process operation with maintaining the natural characteristic and high image quality, which are fitted to the feature of the original image.

As apparent from the above-described explanations, the block image analyzing unit 563 can discriminate the features of the block images from each other in response to the edge strength and the complex degree of this block image. This function may be also utilized to the complex degree judging unit 569 which has been explained in the first embodiment. For instance, if a range block image contains a large amount of high frequency components, then the block image analyzing unit 563 may judge that this range block image corresponds to the busy portion.

It should be understood that the feature of the block image is judged by employing the edge detecting filter in the above-explained description. Alternatively, as explained in the first embodiment, since the similarity judging unit 568 acquires the standard deviation of the domain block image, this similarity judging unit 568 may make such a judgment by utilizing this standard deviation. That is, in the case that the standard deviation is smaller than such a first threshold value different from the above-described first threshold value "TH1", the similarity judging unit 568 may judge that the block image of interest is the flat portion. In the case that the standard deviation is larger than this first threshold value, the similarity judging unit 568 may count a total inverting time of own pixel values with respect to the adjoining pixel values along the changing direction, and when this count value is smaller than such a second threshold value different from the above described second threshold value "TH2", the similarity judging unit 568 may judge that the block image of interest is the edge portion. To the contrary, in the case that this count value is larger than such a second threshold value, the similarity judging unit 568 may judge that the block image of interest is the busy portion. In such a case that a domain block image is small, the similarity judging unit 568 may judge a feature of a central block image from a block image having a size of 3×3 pixels while this small domain block images is set as a center. Alternatively, instead of the above-described judging operation that the features of the block images are clearly discriminated from each other based upon the threshold values, namely, the region is separated based on the threshold values, for example, a variation in the combinations of the enlarging process operations may be added in such a manner that the enlarging manner of the flat portion is blended with the result of either the edge portion enlarging manner or the busy portion enlarging manner. As previously explained, the image is separated into the flat portion, the edge portion, or the busy portion by executing the various sorts of manners, and then, the manner for the enlarging process operation is changed, so that the partial image quality can be furthermore improved.

It should be noted that this enlarging manner of the third embodiment is more or less resembled to the manner described in the above-explained Japanese Laid-open Patent Application No. HEI-11-331595 in such a technical point view that the enlarging manners are switched, or blended to each other in response to the image characteristic. However, this conventional manner described in Japanese Laid-open Patent Application No. HEI-11-331595 owns the following drawback. That is, since there is such a trend that the linear interpolation method is selected at the edge portion in which the difference between the linear interpolation and the fractal enlargement, the clear edge which is the feature of the fractal enlargement cannot be reproduced, so that the edge portion is blurred. To the contrary, according to the enlarging manner of the third embodiment, since the enlarging process operation can be surely carried out at the edge portion by way of the similar manner to that of the first embodiment, there is no problem that the edge portion is blurred.

Figure 14:
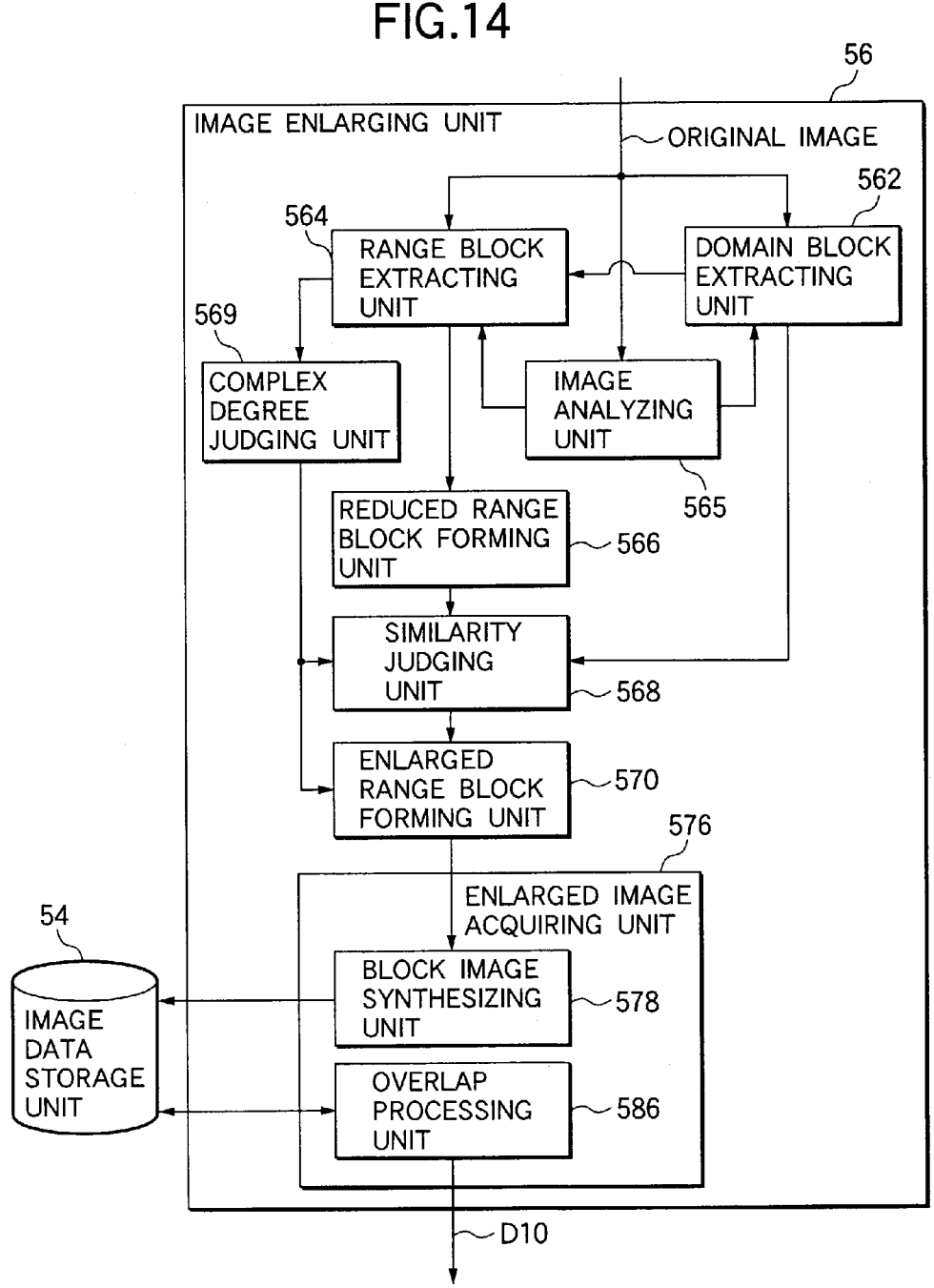
FIG. 14 is a block diagram for showing an image enlarging process unit according to a fourth embodiment.

FIG. 14 is a block diagram for indicating a detailed internal arrangement of the image enlarging process unit 56 of the image processing apparatus 5 according to a fourth embodiment of the present invention. In the fourth embodiment, at least one of a domain block size and a range block size is changed in response to a strength of an edge portion and a complex degree of block images, which are contained in an original image. To this end, the image enlarging process unit 56 of this fourth embodiment includes an image analyzing unit 565 for analyzing a strength of an edge component and a complex degree of block images, which are contained in an original image. This image analyzing unit 565 may own both functions of an edge strength judging unit and a complex degree judging unit. The edge strength judging unit judges a strength of an edge component contained in an original image. The complex degree judging unit divides an original image into a plurality of block images each having a predetermined size, and then judges a complex degree of these separated block images. Then, the domain block extracting unit 562 sets a dimension of a first block unit with reference to the strength of the edge component and/or the complex degree of the block images, which are judged by the image analyzing unit 565. Also, the range block extracting unit 564 sets a dimension of a second block unit with reference to the strength of the edge component and/or the complex degree of the block images, which are judged by the image analyzing unit 565.

As to the function portion as the complex degree judging unit of the image analyzing unit 565, while the original image is divided into a plurality of block images each having the predetermined size, standard deviation of pixel values within a block is calculated with respect to each of these block images, and then, the complex degree judging unit discriminates as to whether or not a block image having a predetermined size corresponds to such a block image of a portion containing an edge based upon this calculated standard deviation. In other words, a check is made as to whether or not this block image corresponds to such a block image of a substantially flat portion which contains substantially no edge. Also, as to a block image containing an edge, a local continuity characteristic of the block image having the predetermined size is obtained, and then, the complex degree judging unit discriminates based upon this calculated local continuity characteristic as to whether the block image having the predetermined size corresponds to such an image of a stepped edge portion containing an edge whose strength is relatively high, or such an image of a busy portion containing a portion in which edges whose strengths are relatively weak are concentrated.

Figure 15:
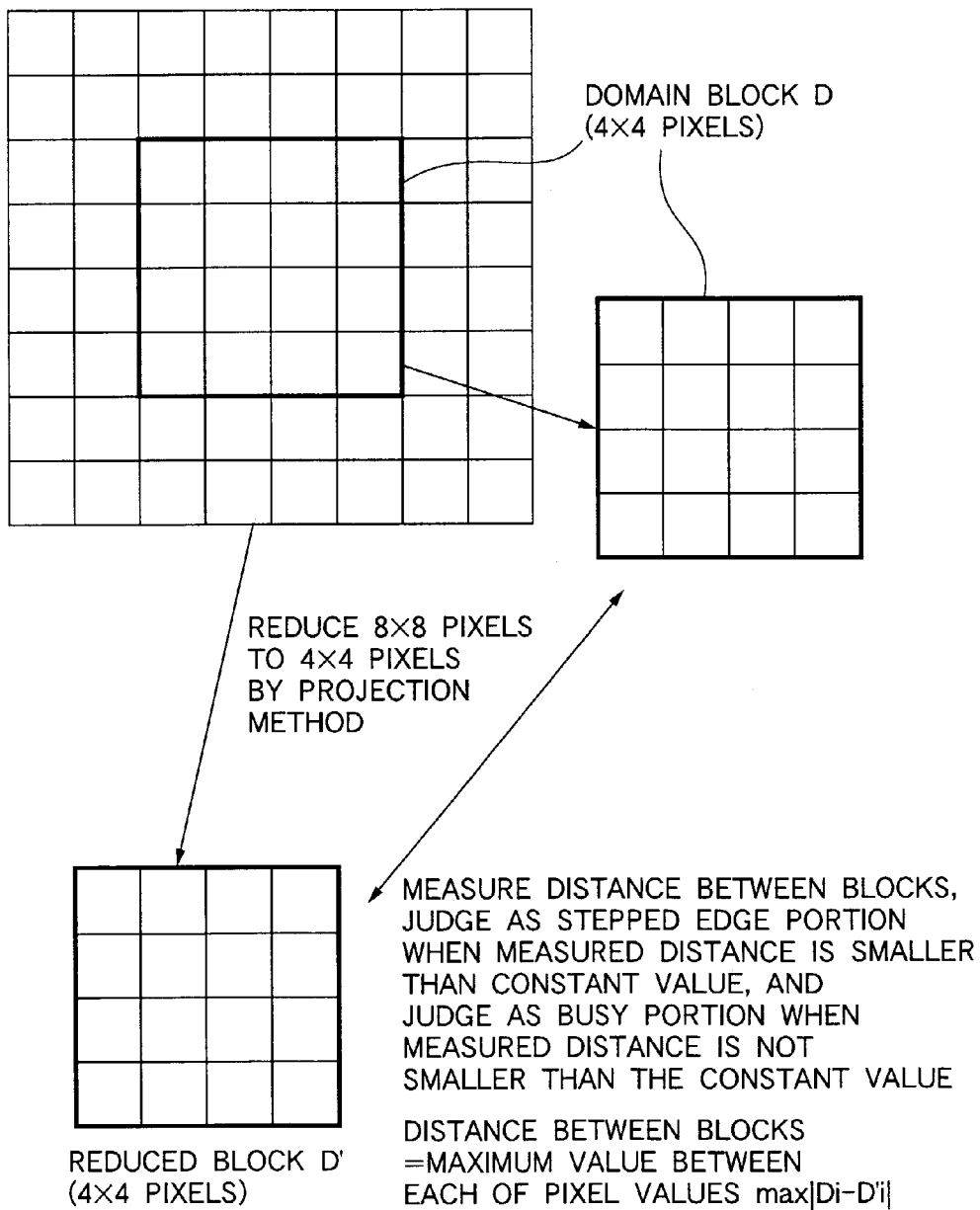
FIG. 15 is a diagram for explaining operations of an image analyzing unit in the fourth embodiment.

FIG. 15 is an explanatory diagram for explaining operations of the image analyzing unit 565. This image analyzing unit 565 firstly sets both a domain size "D" and a range size "R" of default, for instance, D=4 and R=7. Then, the image analyzing unit 565 (in particular, function portion of complex degree judging unit) measures a complex degree of a block image every domain block. For example, the image analyzing unit 565 measures a complex degree of a block image under the following conditions "A" and "B" The condition "A" is that standard deviation of pixel values contained in the domain block is larger than, or equal to a constant value, namely, whether or not such a portion whose edge strength is relatively large, is contained. The condition "B" is that both a reduced block "D'i" having a size of 4×4 and a distance between the own reduced block and the domain block (block interval distance; namely, maximum value of differences of respective pixel values "max |Di− D'i|") are within a constant value. This reduced block D'i is obtained by reducing a peripheral block having a size of 8×8 containing this domain block Di in the projection manner. The image analyzing unit 565 may cut out all of the edge portions under condition "A", and furthermore, may discriminate as to whether this cut edge portion corresponds to the busy portion, or the stepped edge portion. In this case, the condition "B" is to utilize that the stepped edge portion owns the strong local continuity characteristic, and the busy portion owns the weak local continuity characteristic. When the local continuity characteristic is strong, even if the peripheral block having the size of 8×8 involving the-block having the size of 4×4 is reduced, similar patterns are produced.

The image enlarging process unit 56 executes the below-mentioned process operations based upon the judgement result obtained by the image analyzing unit 56:

1). The stepped edge portion (conditions "A" and "B" can be satisfied): the enlarging process operation is carried out by maintaining D=4 and R=7.

2). The busy portion (only condition "A" can be satisfied): The enlarging process operation is carried out after the respective sizes are changed into D=3, R=4 (alternatively, D=2, and R=3).

3). Other portion, flat portion (smooth portion) (condition "A" cannot be satisfied): The enlarging process operation is performed after the respective sizes are changed into D=2, R=3.

When such a process operation is performed, in such a case that the enlarging process operation is preferably carried out by a larger block size than the block size of the step edge portion whose local continuity characteristic is strong, the enlarging process operation can be carried out as to the larger block image. For example, the enlarging process operation can be performed in a high image quality, while visual image quality deteriorations do not occur as minimum as possible, e.g., blurring phenomenon, ringing in the vicinity of an edge, jaggy, and also block distortion at a block boundary. In other words, the enlarging process operation can be carried out in the natural manner and the high image quality in correspondence with the feature of the original image.

As explained above, the enlarging process operation may be carried out in such a manner that the block image is cut into the stepped edge portion/busy portion/other portions (feature of block image cut into three feature portions), and the domain size D and the range size R are switched. Alternatively, another method may be employed. That is, for instance, while both an enlarged image under D=4 and R=7 and another enlarged image under D=2 and R=3 are formed, these enlarged images may be blended with each other based upon a function of numeral values of the condition "A" and the condition "B." Also, the standard deviation of the main block under the condition "A" is calculated. As explained in the first embodiment, since this calculation also corresponds to such a process operation executed in the similarity judging unit 568, this value may be utilized. In an actual case, while this standard deviation is previously stored in a memory, it is preferable to calculate a similarity when the domain block is extracted.

When such an enlarging process operation is carried out, if, in the stepped edge portion, the enlarging process operation from "R" to "rD" in the enlarged range block forming unit 570 is considered in the relational formula of D<R<rd (r=2 times), then the enlarging ratio is changed from 7 to 8. As a result, since only small linear enlargement is involved, the stepped edge becomes sharp. Also, since fine texture in the busy portion cannot be reproduced under D=4 (namely; busy portion becomes blurred), the present condition is changed into D=2 and R=3, so that reproducibility of the busy portion can be increased. Although other portions may be processed by any conditions, the condition is changed into D=2 and R=3 where the processing speed is fast.

It should be noted that as to the strength values of both the condition "A" and the condition "B", the edge strength becomes high under such a state that the higher the strength value of the condition A becomes, the lower the strength of the condition B becomes. As a result, in this case, when the edge strength is high, the enlarging process operation maybe carried out under D=4 and R=7, whereas when the edge strength is not so high, the enlarging process operation may be carried out under D=4 and R=6. In other words, the enlarging process operation may be performed by twitching the domain size D and the range size R in response to the edge strength.

For example, based upon the complex degree and the edge strength of the block image, both the domain size D and the range size R may be switched in response to the portion whose edge strength is high, the portion whose edge strength is low (namely, portions whose edge strengths are different are discriminated from each other), the busy portion, and other portions. When such a process operation is carried out, in such a case that the processing operation of the block may be preferably performed in the larger block size, while the block image is complex and the edge strength thereof is high, the enlarging process operation may be carried out by separating the block image into larger blocks. For example, the enlarging process operation can be performed in a high image quality, while visual image quality deteriorations do not occur as minimum as possible, e.g., blurring phenomenon, ringing in the vicinity of an edge, jaggy, and also block distortion at a block boundary. In other words, the enlarging process operation can be carried out in the natural manner and the high image quality in correspondence with the featured of the original image. On the other hand, as to such a block which has no complex shape, whose edge strength is weak, and which does not cause the image deterioration problem in connection with the enlarging process operation, since the enlarging process operation is carried out in a smaller block size, the processing speed may be considered at a top priority.

It should also be noted that the discriminating manner for the stepped edge portion, the busy portion, and other (flat) portion, which has been described in the fourth embodiment, may be similarly applied to the above-explained third embodiment. The condition "A" explained in the fourth embodiment may be substantially equal to the condition as described in the third embodiment.

Also, in the explanations of the fourth embodiment, the strength of the edge portion has been judged based upon the strength values of the condition A and of the condition B. The manner for judging the strengths of the edge portions is not limited only to this judging manner, but other known judging manner may be employed.

Figure 16:
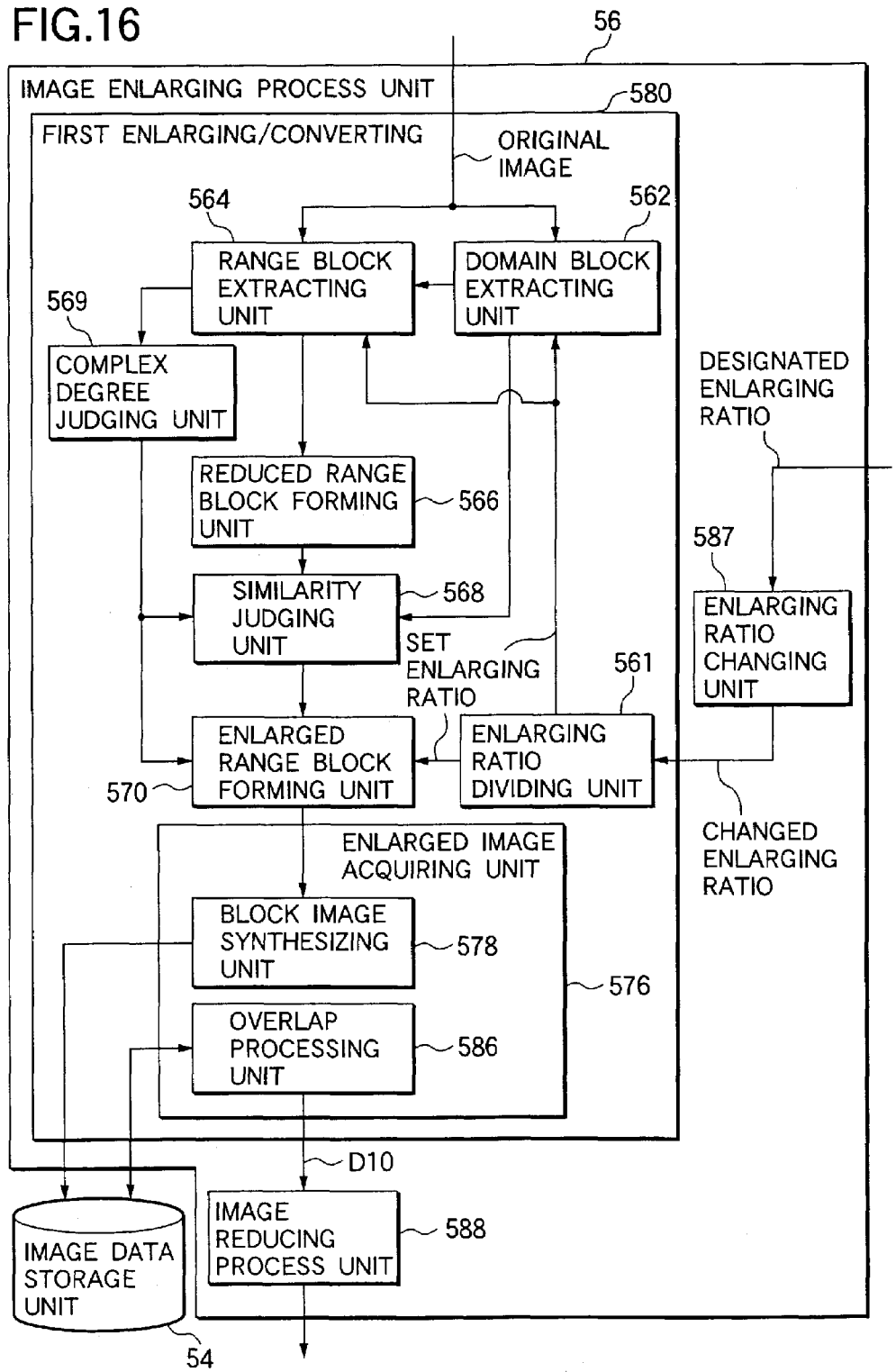
FIG. 16 is a block diagram for showing an image enlarging process unit according to a fifth embodiment.

FIG. 16 is a block diagram for indicating a detailed internal arrangement of the image enlarging process unit 56 of the image processing apparatus 5 according to a fifth embodiment of the present invention. In the fifth embodiment, noise produced in an enlarged image may be removed by reducing the image which has been enlarged in accordance with the above-described enlarging methods of the first embodiment to the fourth embodiment. To this end, the image enlarging process unit 56 of the fifth embodiment contains an enlarging ratio changing unit 587, a domain block extracting unit 562, a range block extracting unit 564, an enlarged range block forming unit 570, and an enlarged image acquiring unit 576. This enlarging ratio changing unit 587 changes a previously-designated enlarging ratio into a larger enlarging ratio than this designated enlarging ratio, and defines this changed enlarging ratio as a set enlarging ratio. The image enlarging process unit 56 further includes a first enlarge converting unit 580, and an image reducing unit 588. The first enlarge converting unit 580 is arranged in a similar manner to that of the second embodiment, and executes an enlarging/converting process operation by the fractal enlarging method. The image reducing unit 588 reduces an enlarged image outputted from the first enlarge converting unit 580 so as to produce an enlarged image in a designated enlarging ratio. It should be understood that FIG. 16 shows such an example that the image reducing process unit 588 is provided with the enlarged image acquiring unit 576 employed in the image enlarging process unit 56 of the second embodiment. Alternatively, this image reducing process unit 588 may be similarly applied to the first, third, or fourth embodiment. The image enlarging process unit 56 enters an output from the image reducing process unit 588 as a finally enlarged image to an image data output unit 59.

The image reducing process unit 588 reduces an image by utilizing, for instance, the linear interpolation method. The image reducing operation based upon the linear interpolation method is identical to the image reducing method as described with reference to FIG. 3. In particular, when this image reducing operation is performed, if the size of the enlarged image is reduced to the size of the original image before the enlarging operation, then such an effect for applying "antialiasing" to the original image may be essentially achieved. Also, since the image which has been enlarged by four times based upon the enlarging method of the second embodiment is reduced by ½, the noise of the image enlarged by two times can be removed, which has been acquired in the first embodiment, and the higher image quality can be achieved. In other words, after an image having a predetermined size is temporarily enlarged to an enlarged image having a larger size than a desirable size, this larger size is reduced to the desirable size, so that the "antialiasing" processing operation may be performed to the edge portion.

Also, in the case that noise (block image distortion and mosquito noise etc.) is originally contained in an original image such as a JPEG image; a pair of these enlarging and reducing operations are repeatedly carried out, so that this noise can be mitigated. In general, when a JPEG image is enlarged, such noise may become conspicuous. In accordance with the method of this fifth embodiment, since the JPEG image is enlarged while removing the noise, it is possible to obtain an image having a high image quality.

Also, for instance, as shown in "combination of enlarging ratios" of FIG. 9, in the case that prime number magnification such as 5 times and 7 times is designated by a user, since this designated magnification value cannot be further subdivided, the second embodiment cannot be applied in which the enlarging ratio is divided and the enlarging process operation is performed by using the divided enlarging ratio so as to improve the image quality. To the contrary, in accordance with the fifth embodiment, for example, the 2-times enlarging operation is repeatedly carried out three times so as to enlarge the original image by 8-times larging rate. Then, the enlarged image are reduced to a desired size. As a result, although the processing speed is sacrificed, the enlarging method of this fifth embodiment can greatly improve the image quality, as compared with that of the conventional enlarging method. This feature may be applied not only to the prime number magnification, but also other magnification (e.g., 6 times) other than $2^n$ times. In view of the image quality, the following arrangement is the best one. That is, while the 2-times enlarging operation is repeated, when the enlarged size becomes larger than the desirable size, this enlarged size is reduced up to the desirable size.

In other words, as represented in "combination of enlarging ratio capable of realizing highest image quality", while the second embodiment is combined with the fifth embodiment, the enlarging ratio "K" designated by the user is firstly changed into $2^n$ times ($K \leq 2^n$) which is very close to the designated enlarging ratio "K", and then, the 2-times enlarging operation is repeated n times. As to $K<2^n$, the enlarged magnification may be reduced to $K/2^n$ so as to be equal to the designated enlarging ratio "K." In the case of combination of the second embodiment and the fifth embodiment, there is a trade-off relationship between the processing time and the image quality. As a result, the magnification may be properly combined with each other in response to such a condition that any one of the processing time and the image quality has a top priority. For example, as to 9 times to 15 times of magnification, such an enlarging process operation capable of enlarging an original image by four times is repeated twice to obtain 16 times. Thereafter, the enlarged size may be reduced to a predetermined size.

Figure 17:
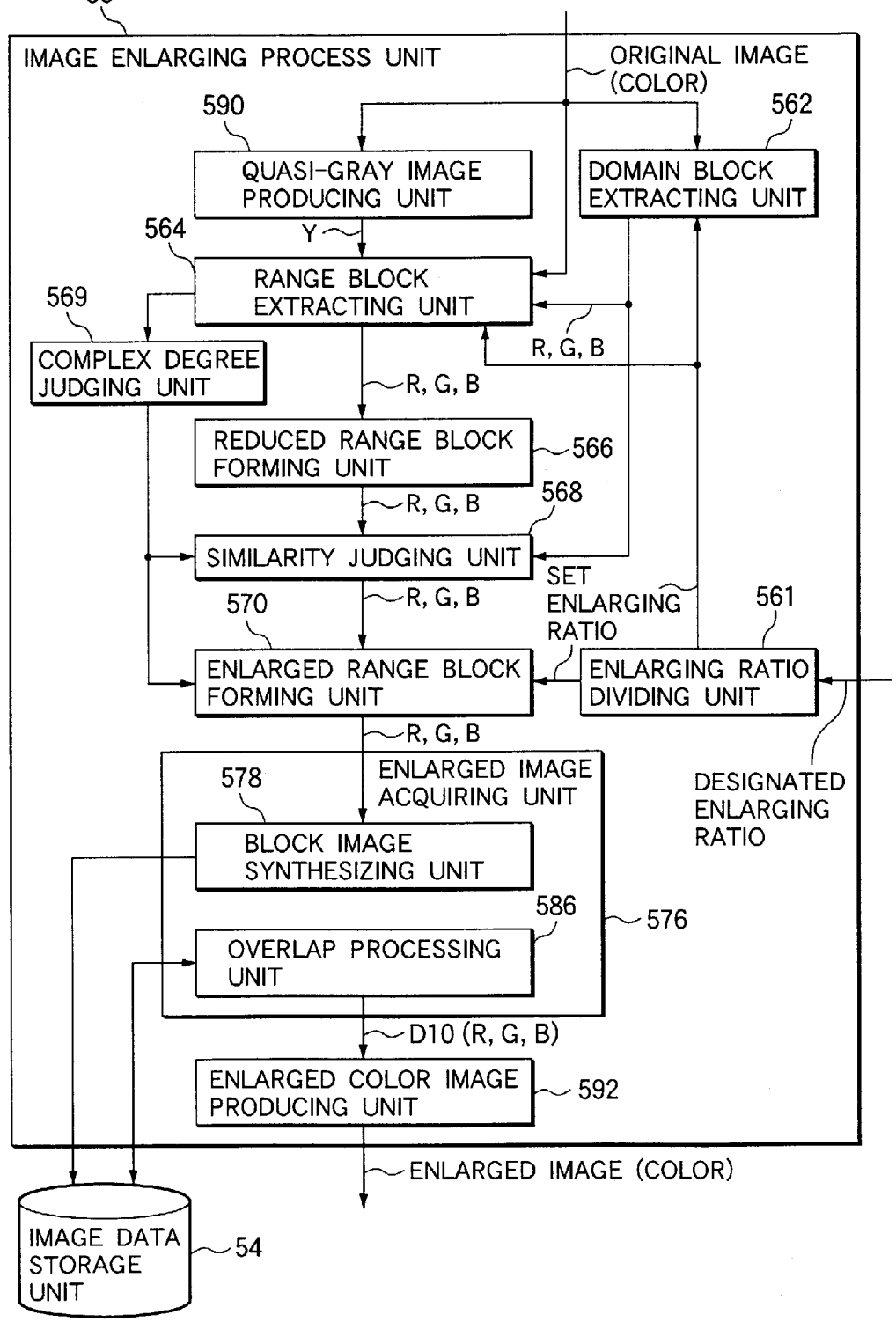
FIG. 17 is a block diagram for showing an image enlarging process unit according to a sixth embodiment.

FIG. 17 is a block diagram for indicating a detailed internal arrangement of the image enlarging process unit 56 of the image processing apparatus 5 according to a sixth embodiment of the present invention. In the sixth embodiment, this enlarging method is especially suitable for a color image. That is to say, the image enlarging process unit 56 of this sixth embodiment is provided with a quasi-gray image producing unit 59. This quasi-gray image producing unit 59 corresponds to an example of a corresponding image producing unit. This corresponding image producing unit produces such a corresponding image which corresponds to a color image based upon a color image corresponding to the respective color components of this color image expressed by a plurality of color components. Also, the enlarged image acquiring unit 576 contains a color enlarged image producing unit 592. This color enlarged image producing unit 592 synthesizes (combines) the images, which are enlarged every color, with each other. It should be noted that although FIG. 17 shows such an example that the quasi-gray image producing unit 590 is provided with the image enlarging process unit 56 of the first embodiment, this quasi-gray image producing unit 590 may be similarly applied to the second to fifth embodiments.

In the quasi-gray image producing unit 590, for instance, the respective color data (for instance, R, G, B color data) indicative of a color image are added to each other in a properly-selected adding ratio, so that a quasi-gray image "Y" is produced and is one example of a corresponding image which corresponds to the color image. For instance, the quasi-gray image producing unit 590 adds the respective R, G, B color data to each other, for instance, in the same adding ratio in order to obtain the quasi-gray image Y (=R+G+B). It should also be noted that this quasi-gray image Y may be produced by employing not only the same adding ratio, but also such an adding ratio of "0.3R+0.6G+0.1B" so as to be substantially equal to illuminance components.

The domain block extracting unit 562 extracts a domain block image every color images corresponding to color components. The range block extracting unit 564 extracts a range block image every color image in such a manner that a corresponding range block image having a range block size corresponding to a range block is extracted from such an image portion in vicinity of an image portion corresponding to the domain block image every color image, which is extracted from the domain block extracting unit 562, and then, the positions of the extracted corresponding range block images are allocated to corresponding positions of the respective color images.

Figure 18:
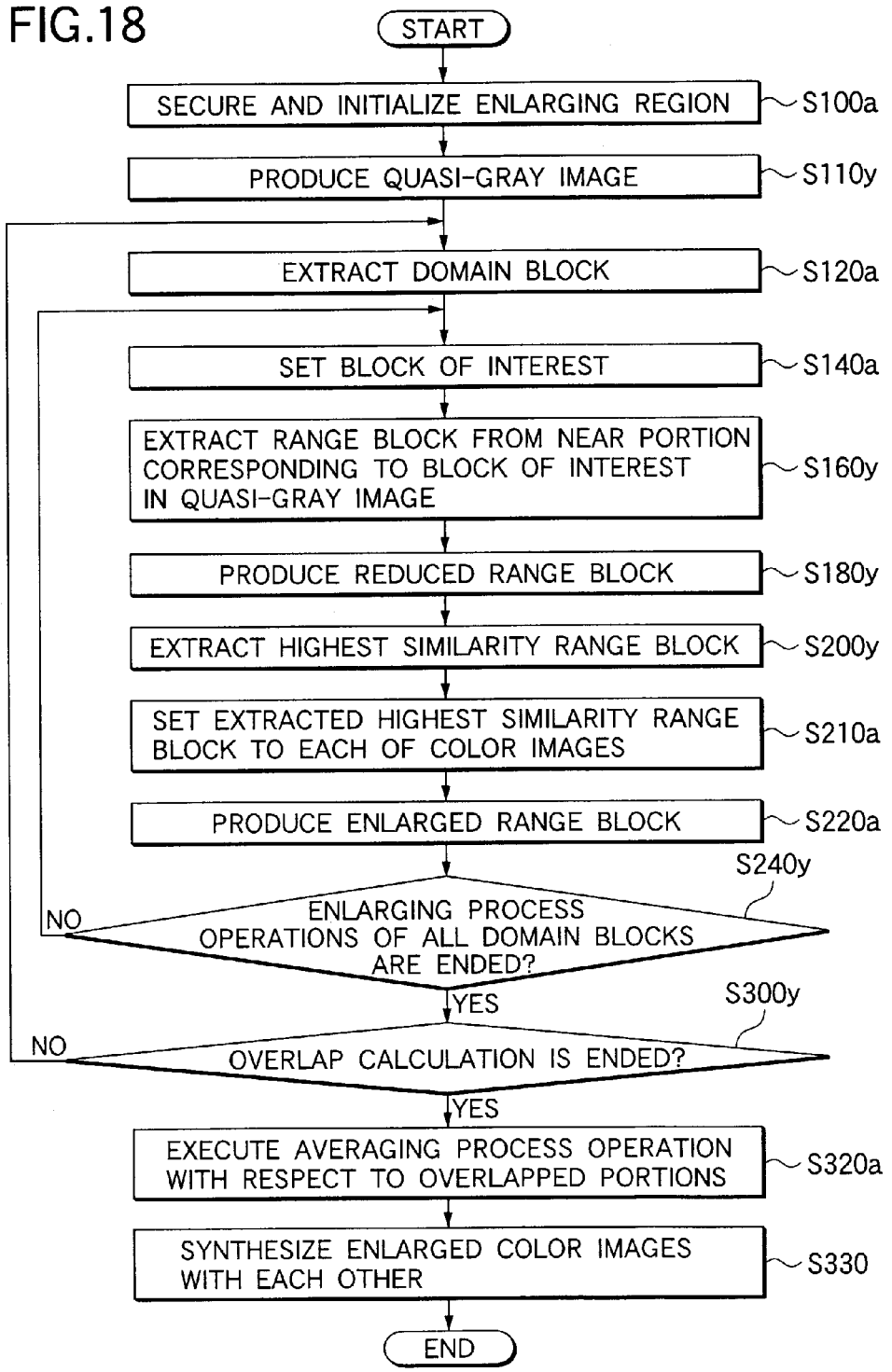
FIG. 18 is a flow chart for describing process sequence operations executed in an image processing apparatus according to a sixth embodiment.

FIG. 18 is a flow chart for describing process sequence operations executed in the image processing apparatus 5 of the sixth embodiment. It should be noted that in this flow chart, as to process operations which are similar to the process operations of the first embodiment and are executed with respect to the respective color data, suffixes "a" are given to the last digits of the same step numbers described in the first embodiment, whereas as to process operations executed for the quasi-gray image, suffixes "y" are given to the last digits of the same step numbers described in the first embodiment.

After a memory region for storing enlarged image data has been secured and also has been initialized (step S100*a*), the quasi-gray image producing unit 590 adds color data R, G, B indicative of a color image to each other based upon a properly-selected adding ratio so as to produce a quasi-color image "Y" (step S110*y*). It should also be noted that the production of this quasi-gray image Y may be carried out immediately before the step S160.

Similar to the above-explained steps S100 to S200 of the first embodiment, the image enlarging process unit 56 calculates a position of the highest similarity corresponding range block having a size of 3×3 with respect to each of domain block images (steps S120*a* to S200*y*). This highest similarity corresponding range block image implies such a corresponding range block image which is similar to a main block image in the highest similarity. The range block extracting unit 564 sets the highest similarity range block image with respect to each of the color images in such a manner that the positions of the highest similarity corresponding range block images defined by the similarity judging unit 568 are set to the corresponding positions in the respective R, G, B images (step S210*a*).

Next, the enlarged range block forming unit 570 enlarges the highest similarity corresponding range block image having the size of 3×3 which has been selected by employing the quasi-gray image Y with respect to each of the R, G, B color images, so that a highest similarity corresponding range block image having a size of 4×4 is formed by employing, for example, such a known method of the linear interpolation method and the projection method (step S220*a*). Subsequently, similar to the first embodiment, an averaging process operation is carried out in connection to an overlap process operation, so that an enlarged image is obtained every color component (steps S240*y* to S320*a*). Then, the color enlarged image producing unit 592 synthesizes (combines) the enlarged color images with each other every color so as to produce an enlarged color image (step S330).

As previously explained, the first to fifth embodiments are especially suitable as the methods capable of enlarging the gray images. Alternatively, as to color data (e.g., R, G, B color data) indicative of a color image, each of color images equivalent to, for instance, a gray image having 256 gradation, is formed. Then, the respective color images are enlarge-processed to produce enlarged color images in accordance with the first to fifth embodiments, and finally these enlarged color images are synthesized with each other, so that an enlarged image of this color image may be obtained. However, in the case that this method is employed, there are some cases that edge positions of R, G, B color data at edge portions are shifted. Also, either noise of these R, G, B color data or noise of mixed color data may be produced. This problem may be mitigated by employing the same range block image positions on the respective R, G, B planes of the domain block image.

As a consequence, in the sixth embodiment, for instance, with respect to an R+G+B signal produced by summing R, G, B signals to each other, a calculation is made of a position of an optimum range block image (highest similarity corresponding range block image) with respect to each of domain block images in a similar manner to the first embodiment. Thereafter, in each of R, G, B, for instance, similar to the first embodiment, least-square coefficients "a" and "b" are calculated among the respective R, G, B range block images located at the same positions as those of the domain block image and the highest similarity corresponding range block image. Then, the respective color images are optimized/approximated so as to obtain an enlarged color image. In other words, while the quasi-gray images are commonly utilized, after the positions of the range block images as to the R, G, B are defined, the enlarging process operation is carried out as to the respective color components.

When such a method explained in the sixth embodiment is employed, substantially no noise appears which may be produced in the case that the positions of the above-explained optimum range block images are calculated every colors. Also, although the positions of the range block images are made equal to each other as to the R, G, B color data, since the pixel value conversion is carried out based upon the least square coefficient optimized to each of the R, G, B range block images, the original image can be faithfully maintained. Also, in the case that the enlarging method of the sixth embodiment is employed, since the time required to seek the block image may be reduced by ⅓, the processing time can be shortened.

In the above-described descriptions, the quasi-gray image "Y" has been employed which has been obtained by adding the respective color data indicative of the color image to each other in the proper adding ratio. This is established under such an initial condition that only the image area located very close to the block image of interest is used as the seeking range, and there is no large color change in this seeking range. However, when a seeking range is widened, since a color change may occur, there is a risk that an artifact (false) signal is produced in an enlarged image. In such a case, if a similarity is judged based upon distances in a color space and then the quasi-gray image Y is corrected based upon this judgement result, even when the seeking range is no risk that the artifact image is produced in the enlarged image.

As previously explained, the enlarging process operations according to the respective embodiments are established based upon the assumption of the: image continuity characteristic. That is, it is so assumed that range block images similar to a domain block image are present toward the same directions and are located very close to this domain block image. Thus, the technical idea of this enlarging process operation is different in broad perspective from the conventional fractal compressing method in which images are self-similar. Also, such a process operation executed in the similarity judging unit 568 for excluding the range block image containing the peaks and the valleys from correspondence relationship with the domain block image may imply that when an original image is enlarged, fine peaks and fine valleys which are not contained in the original image are not recovered. In this aspect, the above-described process operation owns the different technical idea from the fractal idea, namely infinitely fine details are owned.

Also, in the case of the enlarging process operation made based upon the conventional fractal compressing method, since an image is repeatedly mapped to be converged based upon the fixed point theory of the contraction mapping, the conversion coefficient "a" (corresponding to contraction ratio) of the pixel value conversion must be basically defined by $-1<a<1$. To the contrary, since the enlarging process operations of the above-described embodiments do not use the respective converging steps, this condition is not required. As described in the similarity judging operation by the similarity judging unit 568, the pixel value converting parameter can be allowed under broader condition. As a result, the image quality can be largely improved.

As a consequence, although the above-explained enlarging process methods of these first to fifth embodiments utilize the fractal conceptional idea, the resultant enlarged images are not entered into the attractor definition of the fractal theory, and therefore, these enlarging process methods may have different implication as to the conventional fractal enlarging method. As previously described, the enlarging process methods of the respective embodiments may have such a different technical idea from the conceptional idea of the conventional fractal enlarging method. Nevertheless, this enlarging process method of the present invention is featured by that the conceptional idea of the fractal enlarging manner constitutes a very important element thereof, more specifically, this fractal conceptional idea may largely contribute reproducibility of sharp characteristics of edges.

Figure 19:
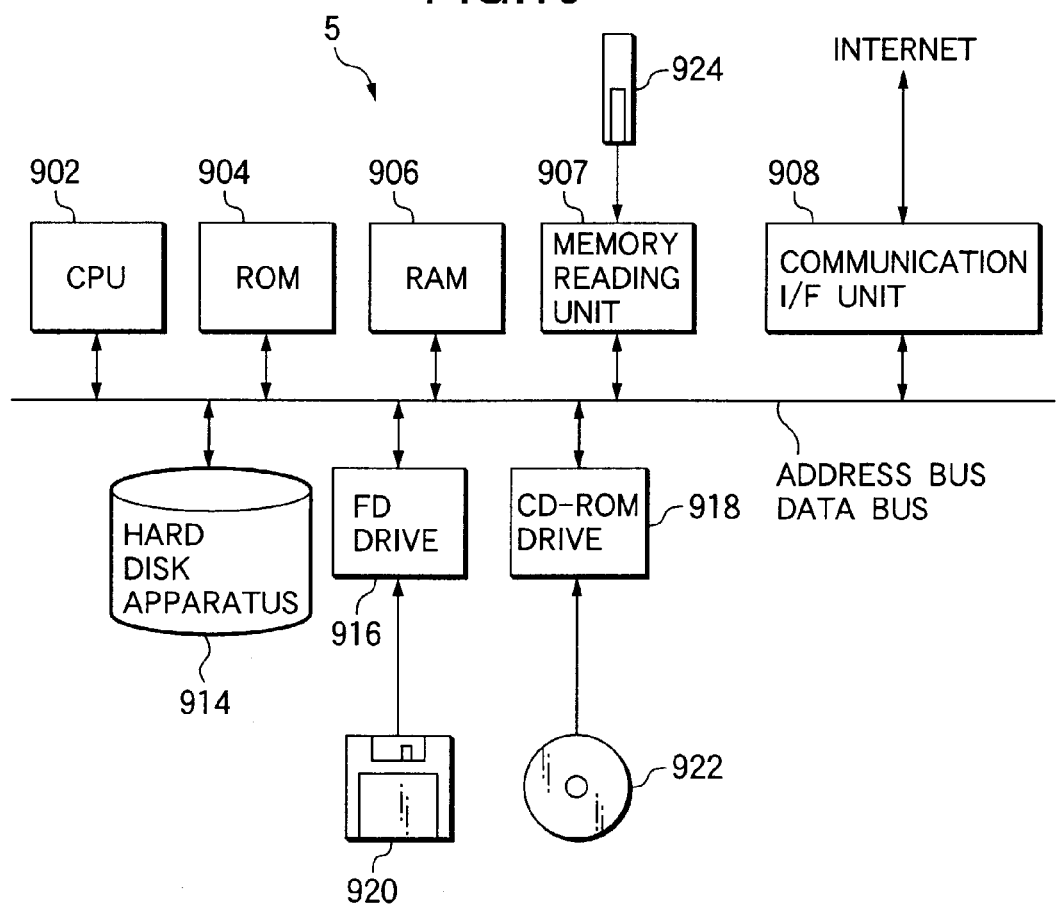
FIG. 19 is a diagram for representing an example of a hardware structure in the case that an image processing apparatus is arranged by employing a computer.

FIG. 19 is a diagram for schematically showing an example of a hardware structure in the case that the image processing apparatus 5 is arranged in a software manner by utilizing a CPU and a memory, namely this image processing apparatus 5 is arranged by employing a computer.

This image processing apparatus 5 is equipped with a CPU 902, a ROM (Read-Only Memory) 904, a RAM 906, and a communication I/F (interface) 908. Also, this image processing apparatus 5 may be provided with a recording/reading apparatus used to record/read data from a storage medium such a hard disk apparatus 914, a floppy disk (FD) drive 916, and a CD-ROM (Compact Disk ROM) drive 918. The hard disk apparatus 914, the FD drive 916, and the CD-ROM drive 918 are utilized so as to register, for example, program data for causing the CPU 902 to execute software process operation. The communication I/F 908 may interface communication data transmitted/received with respect to a communication network such as the Internet.

Such as arrangement of the image processing apparatus 5 may be made similar to the basic arrangement and the operations represented in the above-described embodiments. Also, the program used for causing a computer to execute the above-described process operations is distributed via such a recording medium as a CD-ROM 922. Alternatively, the above-described program may be stored not into the CD-ROM 922, but into an FD 920. Also, while an MO drive is employed, the above-described program may be stored in an MO. Also, the above-explained program may be stored into other storage media such as a non-volatile semiconductor card 924, for example, a flash memory card. Furthermore, the above-explained program may be downloaded via a communication network such as the Internet from another server so as to be acquired, or updated. It should also be noted that as the recording medium, many other storage media than the FD 920 and the CD-ROM 922 may be utilized, for instance, optical recording media such as a DVD, magnetic recording media such as an MD, opt-magnetic recording media such as a PD, tape media, magnetic recording media, and semiconductor memories such as an IC card and a miniature card.

The FD 920 and the CD-ROM 922 as one example of the above-described recording media may store thereinto either a portion or all of the functions contained in the process operations executed by the image processing apparatus 5, which have been explained in the respective embodiments. As a result, the recording media into which the below-mentioned programs and the relevant programs have been stored may be provided. For instance, as to the program used for the image processing apparatus 5, namely the software installed in the RAM 906, similar to the image processing apparatus 5 indicated in the respective embodiments, the respective function units are provided as software forms. The respective function units are defined as the enlarging ratio separating unit 561, the domain block extracting unit 562, the block image analyzing unit 563, the range block extracting unit 564, the image analyzing unit 565, the reduced range block forming unit 566, the similarity judging unit 566, the enlarged range block forming unit 570, the enlarged image acquiring unit 576, the block image synthesizing unit 578, or the overlap processing unit 586. While this software is realized as, for example, a printer driver program and a display driver program, this software may be stored into a portable storage medium such as a CD-ROM and an FK, or may be distributed via a network.

Then, for example, in such a case that the image processing apparatus 5 is constituted by a computer, the CD-ROM drive 918 reads out either data or a program from the CD-ROM 922 and supplies the read data, or program to the CPU 902. Then, the software is installed from the CD-ROM 922 to the hard disk apparatus 914. The hard disk apparatus 91 stores thereinto the data and/or the program read from either the FD drive 916 or the CD ROM drive 910, and stores thereinto such data which is formed by executing the program by the CPU 902, and further, reads therefrom the stored data or program so as to supply the read data/program to the CPU 902. The software stored in the hard disk apparatus 914 is read into the RAM 906, and thereafter, is executed by the CPU 902. For instance, the CPU 902 executes the above-described process operations based upon the programs stored in the ROM 904 and the RAM 906, which correspond to one example of the recording media, so that the functions capable of executing the image enlarging process operation may be realized.

While the present invention has been described by using the embodiments, the technical scope and spirit of the present invention is not limited only to the inventive scopes described by the above-explained embodiments. Thus, the present invention may be modified, changed, and substituted without departing from the technical scope and spirit of the invention. Also, the above-described embodiments are not intended to restrict the claimed invention, but also all of possible combinations of the features described in these embodiments are not necessarily required in the solving means of the present invention.

For example, in the first to fifth embodiments, in the case that there is a sufficiently large memory capacity when an image is processed, while an average value calculation and a standard deviation calculation as to a reduced range block image are previously carried out, and a C-value calculation of a range block image is previously carried out, the calculation results are stored in a table. As a result, such a calculation is no longer required every time a range block image is sought, and the image processing operation may be performed only by referring to the table, so that a total calculation time may be reduced and the processing speed may be furthermore increased.

Also, the similarity judging unit 568 judges the similarity by comparing the reduced range block image with the domain block image. Alternatively, while a size of a domain block is enlarged to the same size as a size of a range block, the similarity judging unit 568 may judge the similarity by comparing this domain block image with the range block image.

Also, when the range block is set in the vicinity of the domain block, a plurality of range blocks and previously extracted in the vicinity of the domain block, and then, the range block having the higher similarity with respect to the domain block is selected from the plural range blocks. Alternatively, the range block may be set in the vicinity of the domain block by employing other manners. For instance, while a feature of an image is previously analyzed, directions of range blocks to be set may be acquired from this image characteristic every domain block.

Also, in the second embodiment, the sizes of the domain block and of the range block are changed (larger) when the enlarging process operation is carried out after the second processing time. Alternatively, the respective block sizes may be made same every time.

Also, in the third embodiment, the feature of the domain block image is separated into the three different types such as the edge characteristic, the busy characteristic, and the flat characteristic, and then, the enlarging process operations are carried out in response to the respective characteristics. Alternatively, the feature of the domain block image may be separated into two different types of the edge characteristic and another characteristic, and then, the enlarging process operation may be carried out based upon these two types. That is to say, when the feature of the domain block image corresponds to either the busy characteristic or the flat characteristic, the same enlarging process operation may be carried out. This reason is given as follows: That is, in the busy characteristic (texture characteristic), although the ringing noise is produced, the level of this ringing noise is low and this ringing noise may be hidden into the texture characteristic and therefore does not become conspicuous. On the other hand, if this busy portion is processed by such an enlarging process operation suitable for this busy portion, for instance, the three-order convolution method, then an element for causing the processing operation may be emphasized and may give less contribution to an improvement of an image quality.

In the respective embodiments, such a arrangement has been explained in which a printing process operation is performed and is displayed by employing enlarged image data. However, the present invention is not limited thereto, but may be applied to various sorts of appliances and systems for handling images. For example, the inventive idea maybe applied to such a copying apparatus in which the color scanner 32, the image processing apparatus 5, and the print engine 70 may be combined with each other.

As previously described in detail, in accordance with the image processing apparatus of the present invention, since the range block image is enlarged in the unit of the enlarged block so as to form the enlarged image, such an enlarged image having a less blurred component can be obtained while the feature of the fractal conceptual idea is realized and the occurrences of the jaggy and of the block distortions are suppressed. Also, the range block image is extracted in the range size which is larger than the domain size and is smaller than the desirable size, and also, the enlarging process operation is carried out with respect to this extracted range block image. As a result, the image processing apparatus can avoid the occurrence of the noise-shaped trash (smear) and oozing of the splinter-shaped pixel value.

Furthermore, after the range block image has been enlarged, the pixel value after the enlargement is again converted based upon the relationship between the domain block image and the range block image, such a visibly-allowable enlarged image can be produced in the high speed within a single processing operation.

As previously explained, in accordance with the image processing apparatus of the present invention, while the balance with respect to the processing time is secured, and the occurrences of the image deteriorations such as the blurring phenomenon, the jaggy, and the block distortion are prevented by utilizing the fractal conceptual idea, the image enlarging process operation with the high image quality can be realized.

What is claimed is:

1. An image processing apparatus for enlarge-processing an original image represented by large number of pixels to acquire an enlarged image, the image processing apparatus comprising:

a domain block extracting unit for dividing the original image by a first block unit to extract a plurality of domain block images from the original image;

a range block extracting unit for extracting a range block image by a second block unit from the original image, the second block unit being larger than the first block unit and being smaller than an enlarged block unit, which is obtained by enlarging the first block unit by a preset enlarging ratio;

an enlarged range block forming unit for forming an enlarged range block image in such a manner that the range block image extracted by the range block extracting unit is enlarged to the enlarged block unit, and each of pixel values of the image enlarged to the enlarged block unit is converted based upon a relationship between the domain block image and the range block image; and an enlarged image acquiring unit for acquiring an enlarged image in such a manner that while employing each of the enlarged range block images formed by the enlarged range block forming unit, the original image is enlarged by the preset enlarging ratio.

2. The image processing apparatus according to claim 1, wherein the range block extracting unit extracts the range block image from an area located in the vicinity of the domain block image extracted by the domain block extracting unit from the original image.

3. The image processing apparatus according to claim 2, wherein the range block extracting unit extracts the range block image so that at least one pixel of a plurality of pixels contained in the range block image is contained in the domain block image.

4. The image processing apparatus according to claim 1, further comprising:

a similarity judging unit for judging a similarity between each of the plurality of range block images extracted by the range block extracting unit and the domain block image extracted by the domain block extracting unit, wherein the range block extracting unit divides an area located in the vicinity of the domain block image extracted by the domain block extracting unit to extract a plurality of the range block images; and wherein the enlarged range block forming unit forms the enlarged range block image, which is judged by the similarity judging unit so that a similarity of the judged range block to the domain block image is higher among the plurality of range block images, by enlarging the judged range block image to the enlarged block unit.

5. The image processing apparatus according to claim 4, further comprising:

a reduced range block forming unit for reducing the plurality of range block images extracted by the range block extracting unit to the first block unit to form a plurality of reduced range blocks, wherein the similarity judging unit judges the similarity by employing the plurality of reduced range blocks formed by the reduced range block forming unit.

6. The image processing apparatus according to claim 5, wherein the similarity judging unit performs a pixel value conversion based on a primary transforming equation "az+b" where symbols "a" and "b" are coefficients with respect to a pixel value "z" of each of the plural reduced range block images formed by the reduced range block forming unit, and selects a reduced range block image, which is the most similar to the domain block image from the plurality of reduced range block images, the pixel values of which have been converted; and wherein the enlarged range block forming unit enlarges the range block image, which is the original of the reduced range block image selected by the similarity judging unit, to the enlarged block unit, and executes a pixel value conversion based on the primary transforming equation "az+b" with respect to a pixel value of the enlarged image to form the enlarged range block image.

7. The image processing apparatus according to claim 6, wherein the similarity judging unit uses a formula "bp=dp−a*rp" where "bp" is a coefficient of the primary transforming equation with respect to a pixel position "p", "dp" is a pixel value of a corresponding pixel of the document block image, and "rp" is a pixel value of a corresponding pixel of the reduced range block image.

8. The image processing apparatus according to claim 6, wherein the enlarged range block forming unit uses a formula "bp=dp−a*rp" where "bp" is a coefficient of the primary transforming equation with respect to a pixel position "p", "dp" is a pixel value of a corresponding pixel of the document block image, and "rp" is a pixel value of a corresponding pixel of the reduced range block image.

9. The image processing apparatus according to claim 4, further comprising a complex degree judging unit for judging a complex degree of the range block image, wherein the similarity judging unit judges the similarity with reference to the complex degree of the range block image judged by the complex degree judging unit.

10. The image processing apparatus according to claim 4, further comprising a complex degree judging unit for judging a complex degree of the range block image, wherein the enlarged range block forming unit determines pixel values of the enlarged range block image with reference to the complex degree of the range block image judged by the complex degree judging unit.

11. The image processing apparatus according to claim 1, wherein the domain block extracting unit sequentially switches an image reading start position and divides the original image by the first block unit to extract the domain block image; and wherein the enlarged image acquiring unit includes an overlap processing unit for acquiring pixel values of an overlap portion, which is produced by sequentially switching the image reading start position based on pixel values of the respective pixels of the overlap portion, the overlap portion being of each of the enlarged images, which have been acquired to be processed so that the image reading start position is sequentially switched, corresponding to the original image.

12. The image processing apparatus according to claim 1, further comprising an enlarging ratio dividing unit for dividing the previously-designated enlarging ratio into a combination of enlarging ratios smaller than the previously-designated enlarging ratio to determine each of the divided smaller enlarging ratios as the preset enlarging ratio, wherein an enlarge repetition process operation is executed in which each of the enlarging ratios divided by the enlarging ratio dividing unit is sequentially applied.

13. The image processing apparatus according to claim 12, wherein the domain block extracting unit changes size of the first block unit every time when each of the enlarging ratios divided by the enlarging ratio dividing unit is sequentially applied.

14. The image processing apparatus according to claim 12, wherein the range block extracting unit changes size of the second block unit every time when each of the enlarging ratios divided by the enlarging ratio dividing unit is sequentially applied.

15. The image processing apparatus according to claim 1, wherein the original image is a color image represented by a plurality of color components, the image processing apparatus further comprising a corresponding image producing unit for producing a corresponding image, which corresponds to the color image based on color images corresponding to the respective color components indicative of the color image, wherein the domain block extracting unit extracts the domain block image every color images corresponding to the color components; and wherein the range block extracting unit extracts a corresponding range block image, which corresponds to the range block, by the second block unit, from an image portion located in the vicinity of the domain block image in the corresponding image produced from the corresponding image producing unit every color images extracted by the domain block extracting unit, and allocate a position of the extracted corresponding range block image to a corresponding position in each of color images corresponding to each of color components to extract the range block image every color images.

16. The image processing apparatus according to claim 1, further comprising:

a first enlarge converting unit including the domain block extracting unit, the range block extracting unit, the enlarged range block forming unit, and the enlarged image acquiring unit, the first enlarge converting unit for executing an enlarge converting process operation based on a first enlarging method;

a second enlarge converting unit for executing an enlarge converting process operation based on a second enlarging method different from the first enlarging method;

a block image analyzing unit for analyzing a feature of the domain block image extracted by the domain block extracting unit; and an enlarging process method selecting unit for selecting one of outputs from the first enlarge converting unit and the second enlarge converting unit based on an image analysis result analyzed by the block image analyzing unit.

17. The image processing apparatus according to claim 16, wherein the block image analyzing unit analyzes as to which the domain block image extracted by the domain block extracting unit has an edge characteristic or a second characteristic, which is different from the edge characteristic as a feature of the domain block image;

wherein the enlarging process method selecting unit selects the output of the first enlarge converting unit when the analysis result of the block image analyzing unit represents that the feature of the domain block image corresponds to the edge characteristic; and wherein the enlarging process method selecting unit selects the output of the second enlarge converting unit when the analysis result of the block image analyzing unit represents that the feature of the block image corresponds to the second characteristic.

18. The image processing apparatus according to claim 17, wherein the block image analyzing unit analyzes as to which the domain block image extracted from the domain block extracting unit has the edge characteristic containing an edge whose strength is relatively strong, a busy characteristic containing a portion where edges whose strengths are relatively weak are concentrated and is a first example of the second characteristic, or a flat characteristic which contains substantially no edge and is a second example of the second characteristic;

wherein the second enlarge converting unit includes:

a busy characteristic enlarge converting unit for executing an enlarge converting process operation based on a manner suitable for the busy characteristic, which is the first example of the second enlarging method; and a flat characteristic enlarge converting unit for executing an enlarge converting process operation based on a manner suitable for the flat characteristic, which is a second example of the second enlarging method;

wherein the enlarging process method selecting unit selects the output of the busy characteristic enlarge converting unit when the analysis result of the block image analyzing unit represents that the feature of the domain block image corresponds to the busy characteristic; and wherein the enlarging process method selecting unit selects the output of the flat characteristic enlarge converting unit when the analysis result of the block image analyzing unit represents that the feature of the block image corresponds to the flat characteristic.

19. The image processing apparatus according to claim 1, further comprising an edge strength judging unit for judging a strength of an edge component contained in the original image, wherein the domain block extracting unit sets size of the first block unit with reference to the strength of the edge component judged by the edge strength judging unit.

20. The image processing apparatus according to claim 1, further comprising an edge strength judging unit for judging a strength of an edge component contained in the original image; and wherein the range block extracting unit sets size of the second block unit with reference to the strength of the edge component judged by the edge strength judging unit.

21. The image processing apparatus according to claim 1, further comprising a complex degree judging unit for dividing the original image into block images each having a predetermined size and for judging a complex degree of the divided block images, wherein the domain block extracting unit sets size of the first block unit with reference to the complex degree judged by the complex degree judging unit.

22. The image processing apparatus according to claim 21, wherein the complex degree judging unit calculates standard deviation of pixel values of the block image having the predetermined size; and wherein the complex degree judging unit discriminates as to whether the block image having the predetermined size corresponds to a block image of a portion containing an edge or a block image of a portion containing substantially no edge based on the calculated standard deviation.

23. The image processing apparatus according to claim 22, wherein the complex judging unit acquires a local continuity characteristic of the block image having the predetermined size; and wherein the complex judging unit discriminates as to whether the block image of the portion containing the edge corresponds to an image of a stepped edge portion containing an edge whose strength is relatively strong or an image of a busy portion containing a portion where edges whose strengths are relatively weak are concentrated.

24. The image processing apparatus according to claim 1, further comprising a complex degree judging unit for dividing the original image into block images each having a predetermined size and for judging a complex degree of the divided block images, wherein the range block extracting unit sets size of the second block unit with reference to the complex degree judged by the complex degree judging unit.

25. The image processing apparatus according to claim 1, further comprising an enlarging ratio changing unit for changing the previously-designated enlarging ratio to an enlarging ratio larger than the previously-designated enlarging ratio;

an enlarge converting unit including the domain block extracting unit, the range block extracting unit, the enlarged range block forming unit, and the enlarged image acquiring unit, the enlarge converting unit for executing an enlarge converting operation based on a fractal enlarging method; and an image reducing unit for reducing the enlarged image outputted from the enlarge converting unit to produce an enlarged image, which is enlarged by the designated enlarging ratio.

26. A computer program embodied in a computer readable medium for enlarge-processing an original image represented by large number of pixels to acquire an enlarged image, the program causing a computer to comprise:

a domain block extracting unit for dividing the original image by a first block unit to extract a plurality of domain block images from the original image;

a range block extracting unit for extracting a range block image by a second block unit from the original image, the second block unit being larger than the first block unit and being smaller than an enlarged block unit, which is obtained by enlarging the first block unit by a preset enlarging ratio;

an enlarged range block forming unit for forming an enlarged range block image in such a manner that the range block image extracted by the range block extracting unit is enlarged to the enlarged block unit, and each of pixel values of the image enlarged to the enlarged block unit is converted based upon a relationship between the domain block image and the range block image; and an enlarged image acquiring unit for acquiring an enlarged image in such a manner that while employing each of the enlarged range block images formed by the enlarged range block forming unit, the original image is enlarged by the preset enlarging ratio.

* * * * *